United States Patent [19]
Akao et al.

[11] Patent Number: 5,492,741
[45] Date of Patent: Feb. 20, 1996

[54] PACKAGING MATERIAL FOR PHOTOGRAPHIC PHOTOSENSITIVE MATERIALS AND LIGHT-SHIELDING BAG FORMED THEREOF

[75] Inventors: Mutsuo Akao; Makoto Kawamura, both of Kanagawa, Japan

[73] Assignee: Fuji Photo Film Co., Ltd., Minami-ashigara, Japan

[21] Appl. No.: 78,032

[22] Filed: Jun. 18, 1993

[30] Foreign Application Priority Data

Jun. 19, 1992 [JP] Japan .................................. 4-161030

[51] Int. Cl.$^6$ ...................................... B29D 22/00
[52] U.S. Cl. ................. 428/35.2; 428/35.3; 428/218; 428/219; 428/213; 428/220; 428/315.7; 428/315.9; 428/317.9; 428/318.4; 428/319.3; 428/319.7; 428/319.9
[58] Field of Search .................................. 428/35.8, 35.9, 428/36.5, 218, 219, 220, 213, 315.7, 315.9, 317.9, 318.4, 319.3, 319.7, 319.9, 35.2, 35.3

[56] References Cited

U.S. PATENT DOCUMENTS

| | | | |
|---|---|---|---|
| 4,337,285 | 6/1982 | Akao et al. | 428/35 |
| 4,452,846 | 6/1984 | Akao | 428/220 |
| 4,469,741 | 9/1984 | Akao | 428/214 |
| 4,565,733 | 1/1986 | Akao | 428/215 |
| 4,661,395 | 4/1987 | Akao | 428/213 |
| 4,661,401 | 4/1987 | Akao | 428/215 |
| 4,906,517 | 3/1990 | Akao et al. | 428/216 |

*Primary Examiner*—James J. Seidleck
*Assistant Examiner*—Michael A. Williamson
*Attorney, Agent, or Firm*—Burns, Doane, Swecker & Mathis

[57] ABSTRACT

A packaging material for photographic photosensitive materials consisting essentially of a cushioning sheet having a density of less than 0.5 g/cm$^3$, a wear-resistant heat-resistant flexible sheet having a Young's modulus of not less than 50 kg/mm$^2$ provided on one side of the cushioning sheet, and a wear-resistant flexible sheet having a Young's modulus of not less than 50 kg/mm$^2$ provided on the other side of the cushioning sheet, the outer most layer provided on said the other side having heat sealability, and the packaging material having complete light-shielding ability as a whole, and a light-shielding bag for photographic photosensitive materials made by fusion to join the layers having heat sealability in the above packaging material. The packaging material for photographic photosensitive materials can be heat-sealed entirely and can continuously be made into a bag automatically by a simple general purpose heat sealer, such as a heat sealing bar or a heat sealing belt, while retaining its physical strength and at a high productivity.

38 Claims, 4 Drawing Sheets

PACKAGING MATERIAL FOR PHOTOGRAPHIC PHOTOSENSITIVE MATERIALS AND LIGHT-SHIELDING BAG FORMED THEREOF

BACKGROUND OF THE INVENTION

This invention relates to a packaging material for photographic photosensitive materials usable for packaging a roll or sheets of photographic film or photographic paper having a sharp edge and a weight of not less than 500 g, and a light-shielding bag formed of it.

A conventional packaging material for photographic photosensitive materials for forming a light-shielding bag is a laminated film having an optical density of not less than 7.5 and a layer construction of PET film layer/adhesive layer/aluminum foil/PO resin layer containing light-shielding material and nonionic antistatic agent in the order from the outside, as disclosed in Japanese Patent KOKAI No. 56-161948. The packaging material is inferior not only in sealability due to insufficient heat sealability but also in physical strength, such as tear strength and impact puncture strength, resulting in the occurrence of bag rupture to lose light-shielding when containing sheets of photographic film having sharp edges without using a pad or a roll of photographic photosensitive material having a weight of not less than 1 kg.

Another conventional packaging material for photographic photosensitive materials comprises, as disclosed in Japanese Patent KOKOKU No. 2-2700, a light-shielding film containing L-LDPE resin in an amount not less than 50 wt. % of the oral polyethylene polymers and not less than 1 wt. % of light-shielding material. The packaging material is excellent in physical strength and heat sealing properties, but is occasionally ruptured by cutting or abrasion caused by dropping or repeated shaking a sealed package containing sheets or a roll of photographic film, photographic paper or the like having sharp edges and a weight of not less than 500 g.

Still another conventional packaging material for photographic photosensitive materials is, as disclosed in Japanese Utility Model KOKOKU No. 2-736, composed of a porous sheet and uniaxially molecularly oriented polyolefin resin film laminated onto both sides so that respective molecular orientation axes are crossed. The packaging material does not rupture, even when a photographic film having sharp edges and a weight of not less than 500 g is contained. However, the packaging material is expensive, because of requiring two film molding machines for stretching uniaxially for laminating two uniaxially molecularly oriented films in a crossed state and the generation of a great trim loss. Since both inside faces facing each other of a bag are the same uniaxially molecularly oriented film, not only is automatic bag making impossible but also an expensive impulse sealer is necessary due to its inferior heat sealing properties. Moreover, heat sealing part must be covered by a heat-resistant Teflon tape protected from the heating bar of the heat sealer so as not to form pinholes at the boundaries of the heat-sealed part, and the heat-sealed part must be cooled immediately after sealing by cooled water. As a result, thermal efficiency is inferior and increases manufacturing cost. Further problems are in gradual decrease of heat seal strength, the generation of static electricity, surface temperature elevation up to more than 70° C. by leaving under the sunlight, the difficulty in the discrimination of obverse side and reverse side under safety light, and the like.

SUMMARY OF THE INVENTION

An object of the invention is to provide a packaging material for photographic photosensitive materials capable of heat sealing capable of automatic bag-making continuously by a simple general purpose hot sealer, such as a heat sealing bar or a heat sealing belt, while retaining its physical strength at a high productivity.

Another object of the invention is to provide a moisture-proof light-shielding bag formed of the above packaging material, with no occurrence of pinholes, rare generation of static electricity, small surface temperature elevation even if left under the sunlight, easy discrimination of obverse side and reverse side even under a safety light, excellent appearance and small decrease of strength at the boundaries of the heat sealed portion, under all conditions of using every photographic photosensitive material.

The present invention provides a packaging material for photographic photosensitive materials which has achieved the above object, which consists essentially of a cushioning sheet having a density of less than 0.5 g/cm$^3$, a wear-resistant heat-resistant-flexible sheet having a Young's modulus (ISO R 1184-1970) of not less than 50 kg/mm$^2$ provided on one side of the cushioning sheet, and a wear-resistant flexible sheet having a Young's modulus (ISO R 1184-1970) of not less than 50 kg/mm$^2$ provided on other side of the cushioning sheet, the outer most layer provided on said the other side having heat sealability, and the packaging material having complete light-shielding ability as a whole.

In the invention, it is essential that the Young's modulus is measured according to ISO R 1184-1970, and at least, the Young's modulus in one direction, which may be the longitudinal direction, the lateral direction or an oblique direction, of the flexible sheets is not less than 50 kg/mm$^2$, preferably not less than 60 kg/mm$^2$ more preferably not less than 70 kg/mm$^2$, particularly preferably not less than 80 kg/mm$^2$. By using the flexible sheets having such a Young's modulus, a packaging material for photographic photosensitive materials which is not ruptured nor curled and does not generate pinholes even though it is used for packaging a roll or sheets of photographic film or photographic paper having sharp edges and a weight of not less than 500 g resulting in complete sealability and light-shielding ability and a light-shielding bag using it can be provided inexpensively.

The present invention also provides a light-shielding bag for photographic photosensitive materials which has achieved the above object, which is made by fusing to join the layers having heat sealability in the above packaging material.

Figure 1:
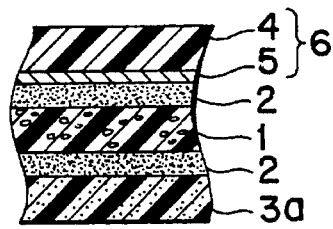
FIGS. 1 through 6 are partial sectional views each illustrating a layer construction of the packaging material for photographic photosensitive materials embodying the invention.

1 ... Cushioning sheet
2 ... Adhesive layer
3a ... Wear-resistant flexible sheet having a Young's modulus of not less than 50 kg/mm² and heat sealability
4 ... Wear-resistant heat-resistant flexible sheet having a Young's modulus of not less than 50 kg/mm²
5 ... Metal membrane layer '6 ... Metallized flexible sheet
7,7a,7a' ... Thermoplastic resin layer
8a ... Coextruded double layer film
9a ... Multilayer laminated film Joined by blocking
10a ... Coextruded triple layer film
11 ... Modified resin layer
12a ... Intermediate layer
13a ... Coextruded quintuple layer film
14 ... Heat sealing layer
15 ... Light-shielding bag for photographic photosensitive materials
a ... indicating the presence of light-shielding material

DETAILED DESCRIPTION OF THE INVENTION

The cushioning sheets applicable Co the invention are paper, nonwoven fabric synthetic paper, foamed sheet and the like, having a density of not more than 0.5 g/cm³, and foamed sheet is preferred because of stable quality, small adverse effect upon photographic properties of photographic photosensitive materials, great cushioning effect, excellent flexibility, inexpensiveness and the like.

The foamed sheet is produced by foaming a thermoplastic resin using a foaming agent, and a suitable density is not more than 0.1 g/cm³, preferably not more than 0.05 g/cm³, further preferably not more than 0.04 g/cm³. A suitable thickness is not less than 100 μm, preferably not less than 300 μm, particularly preferably not less than 500 μm, in view of the improvement in physical strength and cushioning ability, and not more than 5 mm, preferably not more than 3 mm, particularly preferably not more than 2 mm, in view of resistance to delamination, laminating properties and bag-making ability. A suitable expansion ratio is not less than 2 times (density: not less than 0.5 g/cm³), preferably not less than 5 times (density: not more than 0.2 g/cm³), more preferably not less than 10 times (density: not more than 0.1 g/cm³), more preferably not less than 20 times (density: not more than 0.05 g/cm³), particularly preferably not less than 25 times (density: not more than 0.04 g/cm³), in view of the improvement in physical strength and cushioning ability, and not more than 50 times (density: not less than 0.02 g/cm³) in view of cost, resistance to delamination, laminating properties and bag-making ability.

Preferable thermoplastic resins for the foamed sheet include ethylene copolymer resins and homopolyethylene resin, and resin compositions containing LDPE resin, L-LDPE resin, EVA resin or EEA resin in an amount of not less than 50 wt. % are particularly preferable. It is also preferable to improve the physical strength or elasticity of the foamed sheet by crosslinking or modifying the above resins. When the delamination resistance of the foamed sheet is made not less than 50 g/300 mm width, the foamed sheet used is a crosslinked thermoplastic resin foamed sheet having a degree of crosslinking of not less than 10 %, preferably not less than 30 %, more preferably not less than 50 %, particularly preferably 60 to 85 %.

The foaming agent can be selected from those which do not affect photographic properties of photographic photosensitive materials and human body adversely, and suitable foaming agents are volatile ones including aliphatic hydrocarbons, such as propane, butane, pentane and hexane, fluorochlorohydrocarbons, such as trichloromonofldoromethane, dichlorotetrafluoroethane, dichloromonofluoromethane and trlchlorotrifluoroethane, alcohols, such as methanol and ethanol, and mixtures thereof, and the like.

Other suitable foaming agents are decomposable foaming agents having a decomposition temperature of about softening point of the thermoplastic resin to be foamed, usually 58° to 320° C., preferably 80° to 300°, more preferably 90° to 290° C., particularly preferably 100° to 280° C. in the case of polyolefin resin and polystyrene resin. Some suitable decomposable foaming agents are listed below.

| | Decomposition Temperature |
|---|---|
| Inorganic compound: | |
| Ammonium carbonate | 58° C. |
| Sodium bicarbonate | 50° C. (containing 65% water) |
| Azo compound: | |
| 2,2'-azoisobutyronitrile | 85–90° C. |
| Azohexahydrobenzonitrile | 103–104° C. |
| Azodicarbonamide | 190–230° C. |
| Diazoaminobenzene | 90–96° C. |
| Sulfohydrazide compound: | |
| Benzenesulfohydrazide | 90–100° C. |
| Benzene-1,3-disulfohydrazide | 146° C. |
| Diphenylsulfone-3,3'-disulfohydrazide | 148° C. |
| Diphenyloxide-4,4'-disulfohydrazide | 150° C. |
| Nitroso compound: | |
| N,N'-dinitrosopentamethylene-tetramine (DNPT) | 160–200° C. |
| N,N'-dinitroso-N,N'-dimethylterephthalamide | 105° C. |
| Azide compound: | |
| Terephthalazide | 90–110° C. |
| Urea compound: | |
| Polyisopropylene-polyurea | 130–280° C. |

A particularly preferable decomposable foaming agent is polyisopropylene-polyurea represented by the following formula, because the decomposition temperature can be arbitrarily controlled between 130° to 280° C. by selecting the polymerization degree and optimally combining those different in the polymerization degree so as to become about the softening point of the thermoplastic resin to be foamed, as well as very small adverse effects upon photographic properties of photographic photosensitive materials.

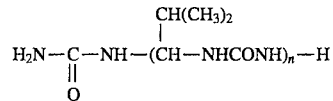

n: an integral number of 1 to 5

Another preferable decomposable foaming agent is azodicarbonamide, because of having a wide decomposition temperature range of 190° to 230° C., a great gas evolution volume of 190 cc/g and small adverse effect upon photographic properties of photographic photosensitive materials.

N,N'-dinitroso-N,N-dimethylterephthalamide is also preferable, because of having a wide decomposition temperature range of 160° to 200° C. Although the dinitroso compound slightly adversely effect photographic properties of photographic photosensitive materials, the adverse effect can be almost removed because the blending amount can be decreased owing to its great gas evolution volume of 240 cc/g. In order to avoid adverse effect upon photographic properties of photographic photosensitive materials, it is preferable to obtain a high expansion ratio by using a small amount of a decomposable foaming agent, and accordingly, preferable decomposable foaming agents have a gas evolution volume of not less than 100 cc/g, preferably not less than 135 cc/g, more preferably not less than 170 cc/g, particularly preferably not less than 190 cc/g. Particularly preferable examples are ammonium carbonate (933), sodium hydrogen carbonate (266), DNPT (240), terephthalazide (205), azodicarbonamlde (190), N,N-dinicroso-N, N'-di-methylterephthalomide (180), benzene-1,3-disulfohydrazide (170) and the like. The number in parenthesis indicates gas evolution volume (cc/g).

A suitable blending amount of the foaming agent in the thermoplastic resin composition, which is preferably a polyolefin resin composition, is 0.1 to 15 wt. %, preferably 0.5 to 10 wt. %, particularly preferably 1 to 7 wt. %.

The thermoplastic resin composition may be blended with foaming assistant, plasticizer, stabilizer, antioxidant, filler or the like, in addition to the foaming agent. It is particularly preferable to blend a foaming assistant in order to obtain a foamed sheet excellent in quality. The foaming assistant can control freely the decomposition temperature of the foaming agent. In the case of foaming thermoplastic resin, there is a suitable melt temperature range for foaming, and it is necessary to decompose the foaming agent in the above temperature range efficiently. For that purpose, a foaming assistant is used which is a foaming accelerator, such as inorganic salts, metal soaps (calcium stearate, magnesium stearate, etc.) organic acids and inorganic acids, a foaming inhibitor, such as organic acids, halogenated organic acids, organic acid anhydrides, polyols, nitrogen compounds, sulfur compounds, phosphates, and tin compounds, or the like. The foaming accelerator lowers the decomposition temperature of foaming agent, and the foaming inhibitor raises the decomposition temperature.

When a polyolefin resin is foamed together with crosslinking, the foamed sheet produced has a great physical strength and an excellent elasticity even at a high expansion ratio. Preferred foams are independent foams because of exhibiting a great cushioning action.

The foamed sheet may be produced by a known method, and typically, a melted thermoplastic resin is kneaded with foaming agent under pressurized conditions, and extruded from a die.

As the wear-resistant heat-resistant flexible sheet and the wear-resistant flexible sheet having a Young's modulus of not less than 50 kg/mm$^2$ there are various thermoplastic resin films, such as various polyethylene resin films, ethylene copolymer resin films, polypropylene resin films, polyvinyl chloride resin films, polyvinylidene chloride resin films, polyamide resin films, polystyrene resin films, polycarbonate resin films, polyester resin films, e.g. polyethylene terephthalate resin films and polyethylene naphthalate resin films, their modified resin films, their uniaxially or biaxially stretched films, metallized films, such as aluminum vacuum metallized films, cellulose acetate films, cellophane films, regenerated cellulose films, ethylene-vinyl alcohol copolymer resin films (Eval resin films), papers, synthetic papers and nonwoven fabrics, and the like. Preferable flexible sheets are dust-free papers formed of various papers having a high Young's modulus, an excellent heat resistance, no adverse effect upon photosensitive materials, and an areal weight of 20 to 400 g/m$^2$, such as unbleached kraft paper, semibleached kraft paper, bleached kraft paper, twisting paper, Clupak paper, Doustress paper, white cardboard, photo base paper, pure white roll paper, coated paper, simili and glassine paper, coated or impregnated with resin or provided with lacquer coating, thermoplastic resin films having light-shielding ability, moistureproofness, antistatic properties and the like, and metallized flexible sheets provided with a metal membrane. The wear-resistant heat-resistant flexible sheet and the wear-resistant flexible sheet may be a laminate of two or more layers selected from the above flexible sheets laminated directly or through an adhesive layer or a coextruded multilayer film formed by coextruding two or more thermoplastic resin layers simultaneously, as well as a single layer alone.

The Young's modulus of the wear-resistant heat-resistant flexible sheet and the wear-resistant flexible sheet is not less than 50 kg/mm$^2$. When the Young's modulus is less than 50 kg/mm$^2$, dust tends to generate Moreover, there is a possibility of being cut by a sharp edge of photographic photosensitive materials. In the case that flexible sheet is disposed as the outermost layer, the flexible sheet elongates by the shock added by an external force to thickness resulting in the reduction of light-shielding ability.

The wear-resistant heat-resistant flexible sheet has a greater heat resistance than the wear-resistant flexible sheet, and has a melting point higher than the wear-resistant by not less than 20° C., preferably not less than 40° C., particularly preferably not less than 60° C. Preferable wear-resistant heat-resistant flexible sheets unstretched, uniaxially stretched or biaxially stretched nylon resin films, polyester resin films, ethylene-vinyl alcohol copolymer resin films, and the like, in view of photographic properties, resistance to pinholes, heat resistance and Young's modulus. Metallized films, of the above films are particularly preferred.

The metallized flexible sheet may be formed by metallizing with a metal simplex, such as Al, Sn, Zn, Co, Cr, Ni, Fe or Cu, an alloy thereof or any other metal capable of metallizing. However, aluminum is the most suitable in view of processing and cost. The purity of aluminum is preferably higher, such as not less than 95% preferably not less than 97%, particularly preferably not less than 99%. Particularly preferable metallized flexible sheets are aluminum vacuum metallized biaxially stretched nylon resin films, aluminum vacuum metallized biaxially stretched ethylene-vinyl alcohol copolymer resin films, aluminum vacuum metallized biaxially stretched polyester resin films and aluminum vacuum metallized biaxially stretched polypropylene resin films, in view of wear resistance, heat resistance, a high Young's modulus, and no occurrence of pinholes. Metallization is carried out according to a known methods such as vacuum deposition, sputtering, ion plating, or electron beam heating, and vacuum deposition is preferable because of a relatively inexpensive equipment, excellent workability and a small metallizing cost. A suitable thickness of the metal membrane is 55 to 1,200 Å in view of physical strength, light-shielding ability, antistatic property, moistureproofness, cost, quality and the like. When the thickness is less than 55 Å, not only the electrification generated on both sides of the metal membrane cannot be reduced by the metallized flexible sheet alone, but also the moistureproofness and light-shielding ability necessary as a packaging material for photosensitive materials cannot be ensured unless the flexible sheet layer and the light-shielding layer disposed onto both sides of the metal membrane are thickened. When the thickness exceeds 1,200 Å, problems occur in the degradation of flexible sheet by the heat added in the vacuum deposition process and in the decrease of the physical strength of the laminated film, although antistatic properties, moistureproofness and light-shielding ability are ensured. In the case of aluminum-metallized membrane, a preferable thickness is not less than 70 Å, more preferably 80 to 800 Å, further more preferably 100 to 600 Å.

A protective layer may be provided on the metal membrane, if necessary. Materials usable for the protective layer include acrylic resin, cellulose resins such as cellulose acetate resin, urethane resin, epoxy resin, polyester resin, ionomer resin, ethylene-ethyl acrylate copolymer resin, various polyethylene resins and various polypropylene resins. Wax gelatin and polyvinyl alcohol are also usable. The thickness of the protective layer is made extremely thin such as thinner than 50 µm in order to eliminate stated electricity effectively, even in the case that the protective layer Ks formed by the extrusion laminating. When the thickness is thinner than 5 µm by employing the known solution coating, spray coating or the like, static electricity can be removed effectively as well as the metal membrane layer can be protected. It is also preferable to coat a UV setting type resin layer or a thermosetting type resin layer in a thickness of not less than 5 µm. The above resins and apparatuses used for coating may be known ones.

The above metallized flexible sheet has an oxygen permeability of not more than 50 cc/m$^2$.24 hr.1 atm.20° C. measured by The MOCON method (A uniform pressure method according co ASTM D-3985) and a moisture permeability of not more than 5 g/m$^2$.24 hr measured by the cup method (40° C., 90 % RH) of JIS Z-0208, and can keep the quality of photographic photosensitive materials for a long period. Particularly, when the thickness of the aluminum membrane is not less than 400 Å the aluminum membrane has an oxygen permeability of not more than 35 cc/m$^2$.24 hr.1 atm.20° C. and the moisture permeability of not more than 3 g/m$^2$.24 hr which are effective for the photographic photosensitive materials containing a sensitizing dye and photographic photosensitive materials having a high sensitivity which are degraded by oxygen or moisture, the quality of these photographic photosensitive materials can be kept for a long period of more than 2 years. When a packaging material having an oxygen permeability of not more than 20 cc/m$^2$.24 hr.1 atm.20° C. and a moisture permeability of not more than 2 g/m$^2$.24 hr in used, even high sensitivity photographic photosensitive materials having an ISO photographic speed of not less than 100 containing various couplers and dyes, they can keep their good quality for more than 2 years. By using a packaging material having an oxygen permeability of not more than 15 cc/m$^2$.24 hr.1 atm.20° C. and a moisture permeability of not more than 1.5 g/m$^2$.24 hr, even high sensitivity photographic photosensitive materials having an ISO photographic speed of not less than 400, they can keep their good quality for more than 2 years.

In the packaging material for photographic photosensitive materials of the invention, the outermost layer on the photographic photosensitive material side has heat sealability. The outermost layer having heat sealability may be provided only for the heat seal purpose, or the aforementioned wear-resistant flexible sheet has heat sealability. The layer having heat sealability may be formed of a polyolefin resin, and ethylene copolymer resins are preferred because of rare adverse effect upon photographic photosensitive materials, excellent heat sealing properties, such as aging heat seal strength, sealability with other materials and resistance to pinholes, and great physical strength.

Suitable ethylene copolymer resins are ethylene-vinyl acetate copolymer (EVA) resin, ethylene-propylene copolymer resin, ethylene-1-butene copolymer resin, ethylene-butadiene copolymer resin, ethylene-vinyl chloride copolymer resin, ethylene-methylmethacrylate copolymer (EMM) resin, ethylene-methyl acrylate copolymer (EMA) resin, ethylene-ethyl acrylate copolymer (EEA) resin, ethylene-acrylonitrile copolymer resin, ethylene-acrylic acid copolymer (EAA) resin, ionomer resin (copolymer of ethylene and unsaturated acid crosslinked using metal such as zinc), ethylene-α-olefin copolymer (L-LDPE) resin, ethylene-propylene-butene-1 ternary copolymer resin, polyethylene resin elastomer, and the like. Among the above ethylene copolymer resins, L-LDPE resin and EEA resin are preferred, because of being excellent in film moldability and heat sealing properties and having a great bag rupture strength, impact puncture strength and tear strength.

Besides, it is also preferable to blend the other thermoplastic resins, various thermoplastic resin elastomers, various additives, modifiers, etc.

Among the ethylene copolymer resins, particularly preferred is ethylene-α-olefin copolymer resin which is called, in general, linear low density polyethylene (L-LDPE) resin.

The L-LDPE resin is called third polyethylene resin, and it is a low cost high strength resin, having the advantages of both low, medium density polyethylene resin and high density polyethylene resin, which meets the requirements, i.e. resource conservation and energy conservation, of the times. The L-LDPE resin is a copolymer of ethylene and α-olefin, and it has a linear structure having short branches. The number of carbon atoms of the α-olefin is 3 to 13. Preferable α-olefin has a number of carbon atoms of 4 to 10, and examples of the α-olefin are butene-1, 4-methylpentene-1, hexene-1, heptene-1, octene-1 and decene-1. The density is usually in the degree of low, medium polyethylene resin and most of commercial resins are in the range of 0.87 to 0.97 g/cm$^3$. Melt flow rate (ASTM D-1238, Condition E) is mostly in the range of 0.1 to 50 g/10 minutes.

As the polymerization process of L-LDPE resin, there are the vapor process and the liquid slurry process using a medium, low pressure apparatus and the ion polymerization process using an apparatus for the high pressure modified method.

Preferable L-LDPE resins in view of physical strength, heat seal strength and inflation film moldability are copolymers of ethylene and α-olefin, of which the number of carbon atoms is 4 to 8, having a male flow rate (MFR) of 0.8 to 10 g/10 minutes, preferably 1 to 7 g/10 minutes (ASTM D-1238, Condition E) and a density of 0.870 to 0.940 g/cm$^3$ (ASTM D-1505) manufactured by the liquid slurry process or the vapor process. Examples of commercial L-LDPE resin are "G-Resin" and "TUFLIN" (UCC), "NUC Polyethylene-LL" and "TUFTHENE" (Nippon Unicar), "Idemitsu Polyethylene-L" and Moretec (Idemitsu Petrochemical), "Dowlex" (Dow chemical), "Suclear" (Dupont de Nemour, Canada), "Marlex" (Phillips), "Neozex" and "Ultzex" (Mitsui Petrochemical Industries), "Nisseki Linirex" (Nippon Petrochemicals), "Stamilex" (DSM) "Mitsubishi Polyethy-LL" (Mitsubishi Petrochemical), and the like. Very low density L-LDPE resins having a density of less than 0.910 g/cm$^3$ are also preferred, such as "NUC-FLX" (UCC) and "Excelene VL" (Sumitomo Chemical).

The EEA resin is hoe restricted, and commercial EEA resins have, for example, a comonomer content of 7 to 41%, a MFR of 1.5 to 1500 g/10 minutes (ASTM D-1238), a density of 0.93 to 0.95 g/cm³ (ASTM D-1505) a brittle temperature of −40° C. to less than −75° C. (ASTM D-746) and a tensile strength of 14 to 160 kg/cm² (ASTM D-638).

By providing a heat sealing layer formed of a polyolefin resin composition containing not less than 2 wt. %, preferably not less than 5 wt. %, particularly preferably not less than 10 wt. %, most preferably not less than 20 wt. %, of the above ethylene copolymer resin, particularly preferably L-LDPE resin wherein α-olefin has a number of carbon atoms of 4 to 10, the light-shielding bag for photographic photosensitive materials has a small aging heat seal strength and is excellent in sealing properties and light-shielding ability.

In the invention, it is preferable to blend various known thermoplastic elastomers, preferably a polyolefin resin elastomer, In an amount of not less than 3 wt. %, preferably 6 to 70 wt. %, particularly preferably 10 to 60 wt. %, for the purpose of the improvement in flexibility, impact strength at low temperature or the like. A particularly preferable thermoplastic resin elastomer is ethylene-propylene rubber because of no adverse effect upon photographic properties and inexpensiveness. As the ethylene-propylene rubber, there are two kinds, i.e. EPM which a copolymer of ethylene and propylene and EPDM which is a ternary copolymer of ethylene, propylene and diene monomer for crosslinking, such as ethylidene norbornene. Since EPM and EPDM do not contain unsaturated bonds in their polymer main chain, they are excellent in heat resistance, and weather resistance and do not adversely affect photographic photosensitive materials, and therefore are particularly preferred.

Antioxidant is blended in the packaging material for photographic photosensitive materials of the invention. Oxidative degradation tends to occur in polyolefin resin having more $CH_3$ branches due to a greater oxygen absorption. Accordingly, oxidative degradation occurs in the order: polypropylene resin>homopolyethylene resin>ethylene-α-olefin copolymer resin. Various polyethylene resins (containing ethylene-α-olefin copolymer resins) and various polypropylene resins (containing propylene-ethylene random copolymer resins) being representative crystalline thermoplastic resins are hydrocarbons, and it is considered that when a radical group is produced through dehydration of hydrocarbon in the presence of oxygen, antoxidation proceeds in the following formulas as chain reaction.

RH→R.

R.+O$_2$→ROO.

ROO.+RH→ROOH+R.

ROOH→RO.+.OH

RO.+RH→ROH+R.

.OH+RH→HOH+R.

Thus, the oxidation of hydrocarbon is accelerated to produce a great quantity of alcohols, aldehydes, acids and the like which adversely affect photographic properties of photographic photosensitive materials, and they react with each other to produce polymer. In order to prevent oxidation of hydrocarbon, it is necessary to intercept the above chain reaction, and antioxidant is used for that purpose. Besides, it is also preferable to add a radical scavenger.

As the radical scavenger suitable for the invention, there are 1,1-diphenyl-2-picrylhydrazyl, 1.3.5-triphenylferudazyl, 2.2,6.6-tetramethyl-4-piperidone-1-oxyl, N-(3-N-oxanilino-1.3-dimechylbytylidene)anilinoxide, high valency metal salts, such as ferric chloride, diphenylpicrylhydrazine, diphenylamine, hydroquinone, t-butylcatechol, dithiobenzyldisulfide, p p'-ditolyltrisulfide, benzoquinone derivatives, nitro compounds, nitroso compounds, and the like. Among them, to use hydroquinone is particularly preferred. The above radical scavenger may be used as a single material, or several kinds may be combined. A suitable content of the radical scavenger is 100 to 1,000, preferably 500 to 5,000 ppm.

It is particularly preferable co combine phosphoric acid, phosphoric acid compound, citric acid, citric acid compound or the like with at least one of the above antioxidants or radical scavengers because of improving the oxidation inhibition synergistically. A suitable content of the antioxidant synergist (the phosphoric acid, etc.) is 0.001 to 2 wt. %, preferably 0.005 to 1.5 wt. %, particularly preferably 0.01 to 1 wt. %.

As the antioxidant, there are radical group chain terminators which react with radical groups, mainly ROO., which are chain carriers, to inactivate them, and peroxide decomposers which decomposes hydroperoxide ROOH which is the main source of radical groups, to stabilize it. The radical group chain terminator includes alkylphenol antioxidant and aromatic amine antioxidant. The peroxide decomposer includes sulfur-containing antioxidant and phosphorus-containing antioxidant. It is preferable to combine the radical group chain terminator and the peroxide decomposer, in order to prevent resin yellowing or browning or the generation of lumps caused by the thermal degradation of thermoplastic resin. Since antioxidant is a reducing agent which adversely affects photographic photosensitive materials, unless its kind and the blending amount is carefully examined, degradation of photographic photosensitive materials becomes a great problem.

In order to prevent thermal degradation of thermoplastic resin, particularly polyolefin resin, preferable to blend 0.001 to 1 wt. %, preferably 0.005 to 0.8 wt. %, particularly preferably 0.01 to 0.5 wt. % of organic cyclic phosphorus compound as a single material or combined with other antioxidant. As the antioxidant combined therewith, it is preferable to blend 0.001 to 1 wt. preferably 0.005 to 0.8 wt. %, particularly preferably 0.01 to 0.5 wt. %, of phenolic antioxidant, particularly hindered phenolic antioxidant, which has radical group chain terminating action different from the peroxide decomposition action of the cyclic phosphorus compound and rarely affects adversely photographic photosensitive materials. It is also preferable further to blend aforementioned radical scavenger and/or phosphoric acid, citric acid, etc. in addition to the above combination because longer continuous molding becomes possible.

Examples of suitable organic cyclic phosphorus compounds are as follows:

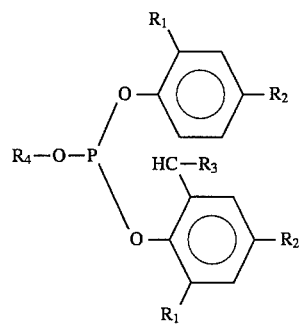

In the formula, $R_1$ represents tertiary butyl group or tertiary amyl group, $R_2$ represents aklyl group having a number of carbon atoms of 1–9, $R_3$ represents hydrogen atom or alkyl group having a number of carbon atoms of 1–4, and $R_4$ represents alkyl group having a number of carbon atoms of 1–30 or aryl group having a number of carbon atoms of 6–15.

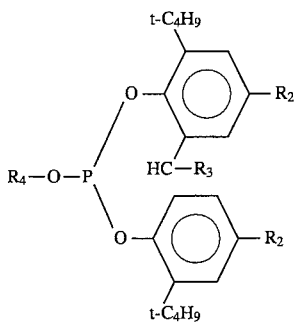

In the formula, the definition of $R_2$, $R_3$ and $R_4$ is the same as above.

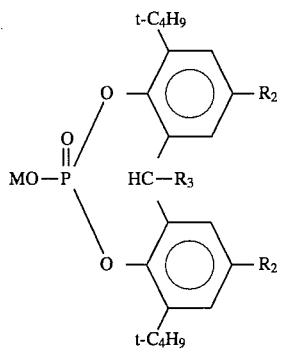

In the formula, the definition of $R_2$ and $R_3$ is the same as above. M represents alkali metal atom.

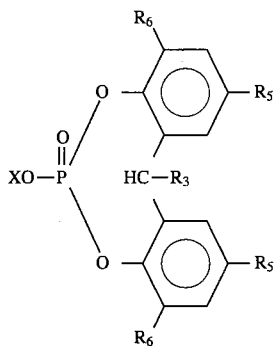

In the above formula, the definition of $R_3$ is the same as above, $R_5$ and $R_6$ represent hydrogen atom, alkyl group, cycloalkyl group, aryl group or aralkyl group having a number of carbon atoms of 1–12, and X represents —OH group or —O$^-$NH$_4^+$.

In order to prevent photodegradation of the container for a photographic film, it is preferable to add 0.001 to 5 wt. %, preferably 0 005 to 3 wt. %, particularly preferably 0.01 to 1 wt. %, of ultraviolet absorber. Particularly preferable ultraviolet absorbers are hindered amine ultraviolet absorbers, such as 2.2,6,6-tetramethyl-4-piperidinol, 2.2,6,6-tetramethyl-4-piperidylbenzoate, etc., and benzophenone salicylic acid compounds, benzotrizaole compounds, ultraviolet absorbers.

Examples of the antioxidant are as follows:

Phenol Antioxidants:

vitamin E (α-tocopherol), 6-butyl-3-methylphenol derivatives, 2,6-di-t-butyl-phenol, 2,6-di-t-butyl-p-ethylphenol, 2,6-di-t-butyl-p-cresol (BHT), 2,6-di-t-butyl-α-dimethylamino-p-cresol, 2,2'-methylenebis-(4-ethyl-6-t-butylphenol), 2,2-methylenebis-(4-methyl-6-t-butyl-phenol), 4,'-butylidenebis(6-t-butyl-m-cresol), 4,4'-thiobis(6-t-butyl-m-cresol), 4,4-dihydroxydiphenylcyclohexane, alkyl group-induced bisphenol, styrene group-induced phenol, 2,6-di-t-butyl-4-methylphenol, n-octadecyl-3-(3',5'-di-t-butyl-4'-hydroxyphenyl)propionate, 2,2'-methylenebis(4-methyl-6-t-butylphenol), 4,4'-butylidenebis(3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis [methylene-3-(3',5'-di-t-butyl-4'-hydroxyphenyl) proplonate] methane, etc.

Ketone-Amine Condensae Antioxidants:

6-ethoxy-2,2,4-trimethyl-1,2-dihydroquinoline, polymers of 2,2,4-trimethyl-1,2-dihydroquinoline, trimethyldihydroquinoline derivatives, etc.

Arylamine Antioxidants:

Phenyl-α-naphthylamine, N-phenyl-β-naphthylamine, N-phenyl-N'-isopropyl-p-phenylenediamine, N,N'-diphenyl-p-phenylenediamine, N,N'-di-β-naphthyl-p-phenylenediamine, N-(3'-hydroxybutylidene)-1-naphthylamine, etc.

Imidazole Antioxidants:

2-mercaptobenzoimidazole, zinc salt of 2-mercaptobenzoimidazole, 2-mercaptomethylbenzoimidazole, etc.

Phosphite Antioxidants:

Alkyl-induced arylphosphite, diphenylisodecylphosphite, sodium phosphite salt of tris(nonylphenyl)phosphite, trinonylphenylphosphite, triphenylphosphite, etc.

Thiourea Antioxidants:

Thiourea derlvatives, 1,3-bis(dimethylaminopropyl)-2-thiourea, etc.

Other Antioxidants:

Those useful for air oxidation, such as dilauryl thiodipropionate, metal deactivators, etc.

Preferable antioxidants are phenol antioxidants, and particularly effective antioxidants are BHT, low volatile high molecular weight phenol antioxidants ("Irganox 1010", "Irganox 1076", trade names of Ciba-Geigy A.G., "Ionox 330", trade name of Shell, "Good-Rite 3114" trade name of Goodrich, "Topanol CA", trade name of I.C.I., etc.), dilaurylthiodipropionate, distearylthiodipropionate, dialkylphosphate, etc. Two or more antioxidants may be combined.

Particularly preferable antioxidants are hindered phenolic antioxidants because of rare adverse effect upon photographic properties of photographic photosensitive materials. The hindered phenolic antioxidants are 1,3,5-trimethyl-2,4, 6-tris(3,5-di-tert-butyl-4-hydroxybenzyl) benzene, tetrakis [methylene(3,5-di-tert-butyl-4-hydroxy-hydrocinnamate) methane], octadecyl-3,5-di-tert-butyl-4-hydroxy-hydrocinnamate, 2,2',2'-tris (3,5-di-tert-butyl-4-hydroxyphenyl)propionyloxy ethylisocyanurate, 1,3,5-tris(4-tert-butyl-3-hydroxy-2,6-di-methylbenzyl) isocyanulate, tetrakis(2,4-di-tert-butylphenyl)-4,4'-biphenylene diphosphite ester, tetrakis [methylene-3-(3,5-di-tert-butyl-4-hydroxyphenyl) propionate] methane, 4,4'-thiobis-(6-tert-butyl-o-cresol), 2,2'-thiobis-(6-tert-butyl-4-methylphenol), tris-(2-methyl-4-hydroxy-5-tert-butylphenyl)butane, 2,2'-methylene-bis-(4- methyl-6-tert-butylphenol), 4,4'-methylene-bis-(2,6-di-tert-butylphenol), 4,4'-butylidenebis-(3-methyl-6-tert-butylphenol), 2,6-di-tert-butyl-4-methylphenol, 4-hydroxymethyl-2,6-di-tert-butylphenol, 2,6-di-tert-4-n-butylphenol, 2,6-bis(2'-hydroxy-3'-tert-butyl-5'-methylbenzyl)-4-methylphenol, 4,4'-methylene-bis-(6-tert-butyl-o-cresol), 4,4'-butylidene-bis-(6-tert-butyl-m-cresol) and the like. According to the properties of antioxidants, two or more kinds of antioxidants may be combined. Preferable antioxidants have a melting point of more than 100° C., particularly preferably more than 120° C.

It is preferable to combine at least one kind of a hindered phenolic antioxidants having a melting point of more than 100° C., preferably more than 120° C. which is a representative radical group chain terminator and at least one kind of phosphorous-containing antioxidant, because of enhancing the effect of inhibiting thermal degradation of resins and additives without degrading photographic properties.

A suitable content of the antioxidant is 0.0005 to 1.5 wt. %, preferably 0.0005 to 0.8 wt. %, more preferably 0.001 to 0.5 wt. %, particularly preferably 0.002 to 0.3 wt. %. When the content is less than 0.0005 wt. %, the blending effect is very small. While, when the content is beyond 1.5 wt. %, photographic photosensitive materials utilizing oxidation-reduction action are adversely influenced by antioxidant, resulting in the occurrence of fogging or sensitivity derivation. Accordingly, it is preferable to blend a minimum amount of the antioxidant capable of preventing coloring troubles and the generation of lumps. As the antioxidant, vitamin E is particularly preferable because of being harmless to the human body, having a great oxidation inhibition effect upon various thermoplastic resins, and being capable of improving light-shielding ability. In addition to oxidation inhibition, when a light-shielding material is combined, vitamin E improves the light-shielding ability in a rate of about 20% compared with the case of using the light-shielding material alone. Accordingly, even if the blending amount of the light-shielding material is decreased by about 15% the packaging material still has a similar light-shielding ability. Thus, vitamin E improves properties, appearance, material cost, and the like. When antioxidant is combined with carbon black, oxidation inhibition synergistically appears. The oxidation inhibition effect is particularly exercised by combining a phenolic antioxidant, a phosphorous-containing antioxidant and carbon black.

Besides, other antioxidants usable in the invention can be selected from those disclosed in "Plastic Data Handbook" (published by Kogyo Chosa Kai), pages 794–799, "Plastic Additives Data Collection" (published by Kagaku Kogyo), pages 327–329, "Plastic Age Encyclopedia, Advance Edition 1986" (published by Plastic Age), pages 211–212, etc.

The packaging material for photographic photosensitive materials of the invention may be blended with lubricant. By blending lubricant, film moldability, slipping character, the dispersibility of light-shielding material and the like can be imporved, and the generation of static electricity can be prevented.

Examples of the lubricant are as follows:
Silicone lubricants:
dimethylpolysiloxanes, modified versions thereof (Shin-Etsu Silicone, Toray Silicone).

Although the silicone lubricants are expensive, they are the most suitable as the lubricant for blending into the heat sealing layer of a packaging bag for photographic photosensitive materials requiring complete light-shielding ability by the following reasons. Particularly, when the following silicone oil is added to the wear-resistant flexible sheet or thermoplastic resin film layers provided on the inner and outer surface of the light-shielding bag blended with not less than 5 wt. %, preferably not less than 20 wt. %, particularly preferably not less than 50 wt. %, of ethylene copolymer resin as a counter-measure against the degradation of heat sealing properties by blending lubricant, unexpected effects are exhibited, such as the improvement in the dispersibility of light-shielding material, the increase of haze by rendering resin turbid into white and the improvement in light-shielding ability by more than 20%, in addition to usual effects as lubricant, such as the improvement in resin fluidity and the improvement in slipping character. As the above ethylene copolymer resin, ethylene-α-olefin copolymer resin is the most preferable because of being excellent in sealability with other materials, hot tack properties, heat seal strength and physical strength.

Suitable silicone oils are those having modified siloxane bonds, such as polydimethylsiloxane and modified versions thereof, polymethylphenylsiloxane, olefin-modified silicone, amide-modified silicone, amino-modified silicone, carboxyl-modified silicone, α-methylstyrene-modified silicone, polyether-modified silicone modified with polyethylene glycol, polypropylene glycol, etc., olefin/polyether-modified silicone, epoxy-modified silicone, alcohol-modified silicone, etc. Among them, olefin-modified silicone, polyether-modified silicone dimethylpolysiloxane, amide-modified silicone, carboxyl-modified silicone, and olefin/polyether-modified silicone are preferable. The silicone oil improves friction coefficient of the wear-resistant flexible sheet in heated conditions, decreases sliding resistance generated during hot plate sealing in an automatic packaging machine and prevents the occurrence of wrinkling. Thereby, the silicone oil provides the wear-resistant flexible sheet which has a beautiful appearance, a high sealability, and adhesion to an article to be packaged without sagging. It also prevents the degradation of gloss by sliding to form a fine sealed portion. In the case of using silicone oil, friction coefficient at high temperature can be not more than 1.4 for sliding heat seal.

The above silicone oil has preferably a viscosity at ordinary temperature of 1,000 to 100,000 centistokes, more prerably 5,000 to 30,000 centistokes. A suitable blending amount varies according to the object of use, and is 0.01 to 5 wt. %, preferably 0.03 to 3 wt. %, particularly preferably 0.05 to 1.5 wt. %. The silicone lubricant may be used as a single material, or may be combined with other lubricants or plasticizers.

Effects of blending silicone oil are as follows: Silicone oil improves the fluidity of resin, decreases motor load of screw and prevents the occurrence of melt fracture. Slipping character can be ensured sufficiently without blending fatty acid amide which tends to bleed out to generate white powder. A fine sealed portion can be formed by decreasing the friction coefficient of the wear-resistant flexible sheet in heated conditions, improving automatic bag-making ability, and preventing the occurrence of wrinkling at the time of heat sealing and the reduction of gloss by sliding. When light-shielding material is combined, light-shielding ability can be improved. As a result, light-shielding ability can be ensured, even though the blending amount of light-shielding material which degrades properties is decreased.

Oleic amide lubricants:
"ARMOSLIP-CP" (Lion Akzo Co., Ltd.), "NEWTRON" and "NEWTRON E-18" (Nippon Fine Chemical Co., Ltd.), "AMIDE-O" (Nitto Kagaku K.K.), "DIAMID O-200" and "DIAMID G-200" (Nippon Kasei Chemical Co., Ltd.), "ALFLOW E-10" (Nippon Oil and Fats Co., Ltd.), etc.

Erucic acid amide lubricants: "ALFLOW P-10" (Nippon Oil and Fats Co., Ltd.), etc.

Stearic acid amide lubricants:
"ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Bis fatty acid amide lubricants:
methylene bis behenic acid amide lubricants, methylene bis stearic acid amide lubricants, methylene bis oleic acid amide lubricants, ethylene bis stearic acid amide lubricants, hexamethylene bis stearic acid amide lubricants, hexamethylene his oleic acid amide lubricants, etc.

Nonionic surfactant lubricants:
"ELECTROSTRIPPER TS-2", "ELECTROSTRIPPER TS-3" (Kao Corp.), etc.

Hydrocarbon lubricants:
liquid paraffin, natural paraffin, microwax, synthetic paraffin, polyethylene wax (preferably not more than 10,000, more preferably not more than 8,000, particularly preferably not more than 6,000, of weight average molecular weight), polypropylene wax (preferably not more than 10,000, more preferably not more than 8,000, particularly preferably not more than 6,000 of weight average molecular weight), chlorinated hydrocarbon, fluorocarbon, etc.

Fatty acid lubricants:
higher fatty acids preferably more than $C_{12}$, hydroxy fatty acids, etc.

Ester lubricants:
fatty acid lower alcohol esters, fatty acid polyol esters, fatty acid polyglycol esters, fatty acid fatty alcohol esters, etc.

Alcohol lubricants: polyols, polyglycols, polyglycerols, etc.

Metallic soap:
metal salts, such as Li, Na, K, Mg, Ca, Sr, Ba, Zn, Cd, Al, Sn, Pb salts, of higher fatty acids, such as lauric acid, stearic acid, succinic acid, stearyl lactic acid, lactic acid, phthalic acid, benzoic acid, hydroxystearic acid, ricinoleic acid, naphthanic acid, oleic acid, etc. and metal salts of stearic acid, such as magnesium stearate, calcium stearate and zinc stearate are preferable.

In the above lubricants, although the hydrocarbon lubricants, the fatty acid lubricants, the ester lubricants and the alcohol lubricants have a relatively small effect on the improvement in slipping character, they improve the dispersibillty of light-shielding ability, extrusion of resin and the like.

A suitable blending amount of the lubricant is 0.001 to 5 wt. %, preferably 0.01 to 3 wt. %, particularly preferably 0.03 to 2 wt. %. When the blending amount is less than 0.001 wt. %, the aforementioned blending effect of the lubricant cannot be obtained. When the blending amount exceeds 5 wt. %, slip is liable to occur between the molten resin and the screw of an extruder resulting in a variation of resin discharge to which in turn causes a variation in layer thickness. Greasiness and bleeding out are also liable to occur.

Light-shielding material may be added to the packaging material for photographic photosensitive materials of the invention. By blending light-shielding material not only light-shielding ability is ensured, but also conductivity, physical properties and the like can be improved.

Representative examples of the light-shielding material are shown below.

Inorganic Compounds:

Oxides . . . Silica, diatomaceous earth, alumina, titanium oxide, iron oxide, zinc oxide, magnesium oxide, antimony oxide, barium ferrite, strontium ferrite, berylium oxide, pumice, pumice balloon, alumina fiber, etc.

Hydroxides . . . aluminum hydroxides, magnesium hydroxides, basic magnesium carbonate, etc.

Carbonates . . . calcium carbonate, magnesium carbonate, dolomite, dawsonite, etc.

Sulfates, sulfites . . . calcium sulfate, barium sulfate, ammonium sulfate, calcium sulfite, etc.

Silicates . . . talc, clay, mica, asbestos, glass fiber, glass balloon, glass bead, calcium silicate, montomorillonite, bentonite, zeolite, etc.

Carbons . . . carbon black, graphite, carbon fiber, carbon hollow bead, etc.

Others . . . iron powder, copper powder, lead powder, aluminum powder, molybdenum sulfide, boron fiber, silicon carbide fiber, brass fiber, potassium titanate, lead titanate zirconate, zinc borate, barium metaborate, calcium borate, sodium borate, aluminum paste, etc.

Organic Compounds:
wood flour such as pine, oak and sawdust, husk fiber such as almond, peanut and chaff, cotton, jute, paper piece, cellophane piece, nylon fiber, polypropylene fiber, various starch (containing modified starch, surface-treated starch, etc.), aromatic polyamide fiber, etc.

Preferable light-shielding materials are inorganic compounds rendering opaque, and light-absorptive carbon black, titanium nitride and graphite are particularly preferable because of being excellent in heat resistance and light fastness and being relatively inactive substances. Carbon blacks are divided into gas black, oil furnace black, channel black, anthracene black, acetylene black, Ketjen carbon black, thermal black, lamp black, vegetable black and animal black according to their origin. Among these, oil furnace carbon black is prefeable in terms of photographic properties, light-shielding character, cost and improvement of properties. On the other hand, since acetylene black and Ketjen carbon black which is modified by-produced carbon black have an antistatic character, they are also preferable, although they are expensive. They may be blended to the oil furnace black in order to improve character. There are various blended forms of light-shielding material, such as uniformly colored pellets (called color compound, and the most commonly used), dispersible powder (called dry color, and treated with various surface-treating agent, mixed with dispersing assistant, and then pulverized into fine particles), paste (dispersed in plasticizer, etc.). liquid (called liquid color, and dispersed with surfactent), masterbatch pellets (light-shielding material is dispersed into the plastic to be colored in a high concentration), wet granular powder (light-shielding material is dispersed into plastic in a high concentration, and processed into granular powder) and dry powder (usual dry powder without being treated), and the masterbatch method is preferred in view of cost and less contamination of the working place. Japanese Patent KOKOKU No. 40-26196 discloses a method of making a masterbatch of polymer-carbon black by dissolving the polymer in an organic solvent and dispersing the carbon black into the solution. Japanese Patent KOKOKU NO. 43-10362 discloses another method of making a masterbatch by dispersing the carbon black into polyethylene.

Particularly preferable carbon black for the molded article for photographic photosensitive materials is the oil furnace carbon black having a pH (JIS K 6221) of 6 to 9, a mean particle size measured by an electron microscopy of 10 to 120 mµ, a volatile components content (JIS K6221) of less than 2.0 % and an oil absorption value (JIS K 6221) of not less than 50 ml/100 g in view of no occurrence of fogging, rare occurrence of photosensitivity deviation and great light-shielding ability. Moreover, when it is blended in L-LDPE resin composition which is the most preferable among various thermoplastic resins in the invention, the lumps of carbon black and pinholes, such as fish eyes, rarely occur in the film. Unless the amount of sulfur components of the carbon black is less than 0 9%, preferably less than 0.7 %, particularly preferably less than 0.5%, measured by ASTM D-6119-60, photographic properties are adversely affected. Since free sulfur components are particularly adversely affect photographic properties, it is preferable to select the light-shielding material containing free sulfur components of less than 0.1% preferably less than 0.05%, particularly preferably less than 0.01%.

As the preferable light-shielding materials, inorganic pigments having a refractive index measured by the Larsen oil immersion method of not less than 1.50, various metal powders, metal flakes, metal pastes, metal fibers, and carbon fiber are next to carbon black. Representative examples are titanium oxide of the rutile type (2.76), titanium oxide of the anatase type (2.52), silicon carbide (2.67), zinc oxide (2.37), antimony oxide (2.35), lead while (2.09), zinc white (2.02), lithopone (1.84), zircon (1.80), corundum (1.77), spinel (1.73), apatite (1.64), baryta powder (1.64), barium sulfate (1.64), calcium carbonate (1.58), talc (1.58), calcium sulfate (1.56), silicic anhydride (1.55), silica powder (1.54), magnesium hydroxide (1.54), basic magnesium carbonate (1.52), magnesite (1.62), dolomite (1.59), alumina (1.50), and the like. The number in parenthesis indicates refractive index. Particularly preferable light-shielding materials have a refractive index of not less than 1.56, more preferably not less than 1.60. On the other hand, since calcium silicate (1.46), diatomaceous earth (1.45), hydrous silicate (1.44) and the like have a refractive index of less than 1.50, they are unsuitable.

Recently, X-ray checking apparatus is used for baggage inspection at air port. When a high sensitivity photographic film having a sensitivity of ISO photographic speed 400 or more is passed through the X-ray checking apparatus, fogging is liable to occur on the photographic film by X-ray. To blend a light-shielding material having a specific gravity of not less than 3.1, preferably not less than 3.4, is preferable for preventing the occurrence of fogging by the X-ray.

The light-shielding material having X-ray-shielding ability as well as light-shielding ability has a specific gravity of not less than 3.1, preferably not less than 3.4, particularly preferably not less than 4.0, and the form may be any form, such as pigment, powder, flake, whisker or fiber. Examples of the light-shielding material having X-ray-shielding ability are silicon carbide, barium sulfate, molybdenum disulfide, lead oxide (lead white), iron oxide, titanium oxide, magnesium oxide, barium titanate, copper powder, iron powder, brass powder, nickel powder, silver powder, lead powder, steel powder, zinc powder, tungsten whisker, silicon nitride whisker, copper-whisker, iron whisker, nickel whisker, chromium whisker, stainless steel powder and whisker, magnesite, apatite, spinel, corundum, zircon, antimony trioxide, barium carbonate, zinc white, chromium oxide, tin powder, their mixtures, etc. Particularly preferable ones are zircon, corundum, barium sulfate, barium chloride, barium titanate, lead powder, lead oxide, zinc powder, zinc white, tin powder, stainless steel powder, stainless steel whisker, iron oxide, tungsten whisker, nickel whisker, etc. Preferable light-shielding materials have a refractive index of not less than 1.50 and a specific gravity of not less than 3.1, more preferably a refractive index of not less than 1.56 and a specific gravity of not less than 3.4.

| Light-Shielding Material | Refractive Index (Larsen oil immersion method) | Specific Gravity (Method A of ASTM D-153) |
| --- | --- | --- |
| Titanium oxide of the rutile type | 2.76 | 4.2 |
| Silicon carbide | 2.67 | 3.17–3.19 |
| Titanium oxide of the anatase type | 2.52 | 3.8 |
| Antimony oxide | 2.35 | 4.6 |
| Lead white | 2.09 | 6.4–6.9 |
| Zinc white | 2.02 | 4.3 |
| Lithopone | 1.84 | 5.59 |
| Zircon | 1.80 | 3.9–4.1 |
| Corundum | 1.77 | 3.9–4.0 |
| Spinel | 1.73 | 3.5–3.6 |
| Apatite | 1.64 | 3.1–3.2 |
| Baryta powder | 1.64 | 4.5 |
| Barium sulfate | 1.64 | 4.3 |
| Magnesite | 1.62 | 3.0–3.1 |
| Carbon black | 1.61 | 1.7–2.1 |
| Dolomite | 1.59 | 2.8–2.9 |
| Calcium carbonate | 1.58 | 2.83 |
| Talc | 1.58 | 2.6–2.8 |
| Quartz powder | 1.54 | 2.5–2.6 |
| Basic magnesium carbonate | 1.52 | 2.2–2.3 |
| Alumina | 1.50 | 3.75 |

A suitable content of the X-ray-shielding light-shielding material is 5 to 80 wt. %, preferably 10 to 70wt. %, particularly preferably 20 to 60 wt. %. In order not to affect adversely photographic photosensitive materials and not to degrade film moldability, the X-ray-shielding light-shielding material is used preferably in a state that weight loss on drying at 100° C. for 5 hours is not more than 2wt. %, preferably not more than 1 wt. %, particularly preferably not more than 0.5 wt. %.

As oil-absoptive inorganic pigment having a function of adsorbing lubricant, antioxidant and organic nucleating agent, which are liable to bleed out, deodorant, agent for adding fragrance, oxygen scavengers etc., there are zinc white (52), asbestine (50), clay (51), titanium dioxide (56), kaolin (60), talc (60), carbon black (not less than 60), activated carbon and the like. The number in parenthesis indicates oil absorption value (ml/g).

The metal powder includes metal paste, and examples are copper powder, stainless steel powder, iron powder, nickel powder, brass powder, silver powder, tin powder, zinc powder, steel powder and the like.

As the aluminum powder including aluminum paste, aluminum powder of which the surface is coated with a surface-coating material and aluminum paste from which low volatile components are removed and then kneaded with a thermoplastic resin are preferred. The paste of aluminum powder is produced by adding a liquid medium such as mineral spirits or and a small amount of a higher fatty acid such as stearic acid or oleic acid to form a paste at the production of aluminum powder according to a known method such as using a ball mill, a stamp mill or an atomizer. The aluminum paste is kneaded together with an aromatic monovinyl resin, such as polystyrene resin or rubber-containing polystyrene resin, a polyolefin thermoplastic resins such as various polypropylene resins, various polyethylene resins, acid-modified resins, EVA resin, EEA resin or EAA resin, low molecular weight polyolefin resin, paraffin wax, tackifier, dispersing agent, such as metallic soap, etc. under heat, and volatile components mainly mineral spirits and white spirits are removed by heat, a vacuum pump or the like up the low volatile component of not more than 3%, preferably not more than 1%, particularly preferably not more than 0.5%. This product is preferably used as aluminum paste compound resin or aluminum paste masterbatch resin. The aluminum paste masterbatch resin is preferable because noxious odors and adverse influences upon the photographic photosensitive materials are eliminated. In order eliminate noxious odor and adverse influences upon the photographic photosensitive materials, the content of mineral spirits should be less than 0.1 wt. %. When the aluminum paste content of the molded article is made 2 wt. % by using a masterbatch resin containing 40 wt. % of aluminum paste and 1.0 wt. % of mineral spirits, one part by weight of the masterbatch resin is blended with 19 parts by weight of the main resin. Since part of the mineral spirits evaporates during molding, the final conent of the mineral spirits is less than 0.05 wt. %. The aluminum powder includes microflakes produced from aluminum foil which is crushed by a ball mill or a stamp mill, in addition typical aluminum powder manufactured by atomization, dropping on a rotary disc or evaporation from melted aluminum. Since aluminum powder is unstable, it is stabilized by a known treatment.

A suitable content of the light-shielding material is 0.01 to 30 wt. % in total in order to ensure qualities as goods, photographic properties, moldability and economical view point of the packaging material for-photographic photosensitive materials of the invention, but it varies according to light-shielding ability. In the case of carbon black and aluminum powder excellent in light-shielding ability, a suitable content is 0.05 To 20 wt. %, preferably 0.1 to 10 wt. %, particularly preferably 0.2 to 7 wt. % in total. When the content is less than 0.01 wt. %, unless the thickness of the packaging material is increased, fogging occurs due to insufficient light-shielding ability. The thickening of the packaging material results in the retardation of molding speed due to lengthening cooling time, and the cost increases by the increase of resin. When the content exceeds 30 wt. %, dispersibility becomes worse to generate microgrits (lumps) which induces pressure marks and abrasion on photographic photosensitive materials. Moreover, a water content of the packaging material increases by the increase of water adsorbed on carbon black, and adversely affects photographic properties, such as fogging, sensitivity deviation and abnormal coloring, upon photographic photosensitive materials. Furthermore, moldability of the packaging material is degraded to induce the occurrence of foaming, silver streaks, pinholes short shot or The like, and physical strength decreases.

It is preferable to coat the surface of a light-shielding material, preferably carbon black, aluminum powder, inorganic pigment having a refractive index of not less than 1.50, inorganic pigment having a specific gravity of not less than 3.4 or inorganic pigment having an oil absorption value of not less than 50 ml/100 g, by surface-coating material, in order to improve the dispersibility into resin and the resin fluidity, to prevent the generation of volatile substances harmful to photographic properties, to decrease hygroscopicity, to prevent fouling of die lip, and the like.

Representative coatings by the surface-coatig material are as follows:

(1) Using a coupling agent:

Coated with a coupling agent containing azidosilane compound (disclosed in Japanese Patent KOKAI No. 62-32125).

Coated with a silane coupling agent.

Coated with a titanate coupling agent.

(2) Coated by depositing silica followed by depositing by alumina.

(3) Coated with higher fatty acid metal salts such as zinc stearate, magnesium stearate or calcium stearate.

(4) Coated with surfactant, such as sodium stearate, potassium stearate or hydroxyethylene dodecylamine.

(5) Coated by reacting barium sulfide aqueous solution with sulfuric acid aqueous solution in the presence of an excess amount of barium ion to produce barium sulfate having a mean particle size of 0.1 to 2.5 μm, adding alkaline silicic acid solution thereto to deposit barium silicate on the surface of the barium sulfate, and depositing hydrous silica on the surface of the barium sulfate produced by the decomposition of the barium silicate by adding mineral acid to the slurry.

(6) Coated with a composition consisting of one or more of the oxides selected from hydrated oxides of metal, such as titanium, aluminum, cerium, zinc, iron, cobalt or silicon, and oxides of metal, such as titanium, aluminum, cerium, zinc, irons cobalt or silicon.

(7) Coated with a polymer having one or more reactive groups selected from aziridine group, oxiazoline group and N-hydroxyalkylamide group.

(8) Coated with polyoxyalkylene amine compound.

(9) Coated with cerium iron, selected acid amion and alumina.

(10) Coated with alkoxy titanium derivative having α-hydroxycarboxylic acid residue as substituent.

(11) Coated with polytetrafluoroethylene.

(12) Coated with polydimethylsiloxane or modified silicone.

(13) Coated with phosphate ester compound.

(14) Coated with divalent to tetravalent alcohol.

(15) Coated with olefin wax, such as polyethylene wax or polyptopylene wax.

(16) Coated with hydrous aluminum oxide.

(17) Coated with silica of zinc compound consisting of zinc chloride, zinc hydroxide, zinc oxide, zinc sulfate, zinc nitrate, zinc acetate or zinc citrate of a combination thereof.

(18) Coated with polyhydroxy saturated hydrocarbon.

Preferable coatings are the above (1), (3), (12), (14), (15), (16) and organic chelate compounds, various antistatic agents, lubricants, dripproofing agents and surfactants, because of rare adverse effect upon photographic photosensitive materials, such as fogging, and being excellent in the improvement in the dispersibility of light-shielding material, in the decrease of lump generation, and in the improvement in resin fluidity.

Particularly suitable coatings are esters of an aliphatic monocarboxylic acid and a monovalent aliphatic alcohol in an amount of 0.001 to 2 wt. % The ester decreases motor load, and improves the dipersibility of light-shielding material and moldability to render the appearance of molded articles beautifil. The ester is composed of an aliphatic monocarboxylic acid having a number of carbon atoms of 20 to 40, preferably 25 to 35 and a monovalent aliphatic alcohol having a number of carbon atoms of 20 to 40, preferably 25 to 35. Examples of the aliphatic monocarboxylic acid are montanic acid, melissic acid, cerotic acid, lacceric acid and the like. Examples of the monovalent aliphatic alcohol are montyl alcohol, melissyl alcohol, lacceryl alcohol, ceryl alcohol and the like. The above esters are also very excellent as the surface-coating material of the light-shielding material because of the improvement in the fluidity of thermoplastic resin and uniform blendability. Moreover, when they are used for coating the surface of the inorganic or organic nucleating agent as the dispersing agent, various excellent effects are exercised, such as the prevention of dusting and bleeding out, and the improvement in dispersibility and resin fluidity and the like.

A suitable coating amount is 0.001 to 5 wt. %, preferably 0.01 to 3 wt. %, particularly preferably 0.05 to 1.5 wt. %, against light-shielding material, such as carbon black or aluminum powder. When the coating amount is less than 0.001 wt. %, the coating effect is insufficient. When the coating amount exceeds 5 wt. %, bleeding out with time increases. Moreover, screw slip occurs that results in a variation of the ejected amount of resin.

A suitable total sulfur content (ASTM D-1619) of the above composite light-shielding material is not more than 1%, preferably not more than 0.8%, particularly preferably not more than 0.5%. A suitable free sulfur component is not more than 150 ppm, preferably not more than 50 ppm, particularly preferably not more than 30 ppm, and an ash content according to ASTM D-1506 is not more than 0.5%, preferably not more than 0.4%, particularly preferably not more than 0.3%. A suitable aldehyde compound content is not more than 0.2%, preferably not more than 0.1%, particularly preferably not more than 0.05%, in order to avoid adverse effects upon photographic properties. Since cyanides also adversely affect photographic properties of photographic photosensitive materials, it is suitable that the hydrogen cyanide quantity determined by the 4-pyridinecarboxylic acid pyrazolone absorption photometry is not more than 20 ppm, preferably not more than 10 ppm, particularly preferably not more than 5 ppm, converted to the weight of light-shielding material.

A suitable blending amount of the light-shielding material is 0.05 to 50 wt % preferably 0.1 to 30 wt %, amount is less than 0.05 wt. %, layer thickness is necessary to be not less than 2 mm in order to ensure the light-shielding ability required as the packaging material for photographic photosensitive materials. Accordingly, it is difficult to put to practical use in view of flexibility and cost. When the blending amount exceeds 50 wt. %, foaming pinholes and fish eyes occur caused by the adsorbed moisture of the light-shielding material, and physical strength decreases. Particularly, in the case of inflation film, film cannot be molded because the inflation bubble becomes unstable.

Fatty acid metal salt may be blended into the packaging material for photographic photosensitive materials of the invention for the purpose of inactivating substances adversely affecting photographic properties. By blending fatty acid metal salt, various advantages are obtained, such as the decrease of bleeding out, the prevention of dusting of organic nucleating agent and the improvement in the dispersibility of organic nucleating agent. Fatty acid metal salt also improves the dispersibility of light-shielding material and moldability, and improves photographic properties by rendering halides harmless by neutralization, which is contained in resin and adversely affect photographic properties. As the fatty acid metal salt, there are combinations of a fatty acid, preferably a higher fatty acid of $C_8$ or more, such as lauric acid, stearic acid, lactic acid, succinic acid, stearyl lactic acid, hydroxystearic acid, ricinoleic acid, naphthenic acid, oleic acid, erucic acid or the like and Li, Na, Mg, Ca, St, Ba, Zn, Cd, Al, Sn, Pb or the like.

A suitable blending amount of the fatty acid metal salt is 0.01 to 10 parts by weight, preferably 0.1 to 5 parts by weight, per 100 parts by weight of the resin composition. As the content of the fatty acid metal salt in the packaging material, a suitable content is 0 01 to 5 wt. % preferably 0.03 to 3 wt. %, particularly preferably 0.05 to 1.5 wt. %. . When the blending amount is 0.01 wt. %, the blending effect is insufficient. When the blending amount exceeds 5 wt. %, bleeding out occurs. Screw slip also occurs that results in a variation in the amount of ejected resin, and molding troubles frequently occur. Blendability is also inferior.

The packaging material for photographic photosensitive materials of the invention may be blended with surfactant resulting in the improvement in antistatic properties, slipping character, inhibition of bleeding out of lubricant, dripproofness, kneadability of light-shielding material or additives, fluidity of resin composition, antiblocking ability and the like.

Examples of the surfactant are shown below.

Nonionic surfactants:

Polyethyleneglycol fatty acid ester, polyoxyethylene sorbitan fatty acid eater, polyoxyethylene fatty alcohol ester, polyoxoyethylene glycerine fatty acid ester, polyoxyethylene fatty amine, sorbitan monofatty acid ester, fatty acid pentaetythritol, fatty alcohol-ethylene oxide adduct, fatty acid-ethylene oxide adduct, fatty amino acid or fatty amide-ethylene oxide adduct, alkyl phenol-ethylene oxide adduct, alkyl naphthol-ethylene oxide adduct, partial fatty ester of polyol-ethylene oxide adduct, alkylamine derivatives, various other nonionic antioxidants disclosed in Japanese Patent KOKOKU No. 63-26697, etc.

Anionlc surfactants:

Sodium salt of ricinoleic acid sulfate ester, various fatty acid metal salts, sodium salt of ricinoleate ester sulfate ester, sulfated oleic acid ethylaniline, sulfate ester salt of olefin, sodium salt of oleyl alcohol sulfate ester, alkyl sulfate ester salt, fatty acid ethyl sulfonic acid salt, alkyl sulfonic acid salt, alkyl naphthalene sulfonic acid salt, alkyl benzene sulfonic acid salt, succinic acid ester sulfonic acid salt, phosphate ester salt, etc.

Cationic surfactants:

Primary amine salts, tertiary amine salts, quaternary ammonium salts, pyridine derivatives, Amphoretic surfactants:

Carboxylic acid derivatives, imidazoline derivatives, betains derivatives.

A suitable blending amount of the surfactant is 0.01 to 51wt. %, preferably 0.05 to 3 wt. %, particularly preferably 0.1 to 1.5 wt. %. When the blending amount is less than 0.01 wt. %, the blending effect of the surfactant is insufficient. When the blending amount exceeds 5 wt. foaming and pinholes are liable to occur, and slip is liable to occur between the molten resin and the screw of an extruder resulting in a variation of the resin discharge that results in a variation of layer thickness. Moreover, greasiness and blocking are liable to occur by the increase of bleeding A dripproofing substance is incorporated in the packaging material for photographic photosensitive materials in order to prevent adhesion of dew and to inhibit the deposition of additives liable to bleed out to form white powder, such as nucleating agent, lubricant and antioxidant.

As the dripproofing substance, there are water-absorptive or hygroscopic substance and dripproofing agent, and includes any substance which renders a contact angle of water of less than 45 degrees, preferably less than 35 degrees.

The dripproofing agent includes diglycerine monostearate ester, polyglycerine monopalmitate ester, sorbitan monolaurate ester, sorbitan monoerucate, polyoxyethylene sorbitan fatty acid ester, stearic acid monoglyceride, palmirate monoglyceride, oleate monoglyceride, laurate monoglyceride, polyoxyethylene nonylphenyl ether, sorbitan sesquipalmitate, diglycerine sesquioleate, sorbitol fatty acid ester, sorbitol fatty acid dibasic acid ester, diglycerine fatty acid dibasic acid ester, glycerine fatty acid dibasic acid ester, sorbitan fatty acid dibasic acid ester, sorbitan palmirate, sorbitan stearate, sorbitan palmatate propylene oxide 3 moles adduct, sorbitan palmitate propylene oxide 2 moles adduct, sorbitol stearate, sorbitol stearate ethylene oxide 3 moles adduct, diglycerine palmirate, glycerine palmitate, glycerlne palmirate ethylene oxide 2 moles adduct, etc.

The dripproofing agent, the water-absorptive substance and the hygroscopic substance may be combined.

It is preferable to provide the packaging material for photographic photosensitive materials containing the dripproofing substance with a surface activation treatment, such as corona discharge, ozone treatment or plasma treatment because of exhibiting dripproof action and antifog action more effectively.

A suitable blending amount of the dripproofing substance is 0.01 to 5 wt. %, preferably 0.1 to 3 wt. %. When the blending amount is less than 0.01 wt. %, antifog effect Is insufficient. The effect of inhibiting the deposition in a form of white powder of additives liable to bleed out, such as lubricant and antioxidant is also insufficient. When the blending amount exceeds 5 wt. %. although the antifog effect is sufficiently exercised, the effect increased by increasing the blending amount is small. Moreover, the surface of the molded article becomes greasy, and dust is liable to adhere. When dust adheres on a photographic film, uneven developing race occurs.

To the packaging material for photographic photosensitive materials of the invention, antiblocking agent may be blended in order to prevent blocking. As the antiblocking agent, there are silica including natural silica and synthetic silica, calcium carbonate, talc (magnesium silicate), aluminum silicate, calcium silicate, higher fatty acid polyvinyl ester, n-octadecylurea, N,N'-dioleyloxamide, N-ethanolstearic amide, dicarboxylic acid ester amide, etc., and silica is preferred. Preferable silica has a mean particle size of 0.3 to 20 μm. When the mean particle size is less than 0.3 μm, aggregation is liable to occur to generate lumps frequently, and antiblocking effect is small. When the mean particle size is more than 20 μm, the film surface is rough by exposing silica particles, and abrasion is liable to occur on the surface of photographic photosensitive materials. A suitable blending amount is 0.01 to 5 wt. %, preferably 0.05 to 3 wt. %, particularly preferably 0.1 to 2 wt. %. When the blending amount is less than 0.01 wt. %, antiblocking effect is insufficient. When the blending amount exceeds 5 wt. %, not only lump-formed unevenness trouble occurs resulting in the occurrence of pressure marks and abrasion on photographic photosensitive materials, but also physical strength and heat sealing properties of the resin film degrade.

The packaging material for photographic photosensitive materials of the invention may be blended with an organic or inorganic nucleating agent. By blending nucleating agent, crystallization is accelerated resulting in the improvement in various properties, such as Young's modulus, rigidity and film moldability.

The organic nucleating agent includes carboxylic acids, dicarboxylic acids, their salts and anhydrides, salts and esters of aromatic sulfonic acids, aromatic phosphinic acids, aromatic phosphonic acids, aromatic carboxylic acids and their aluminum salts, metal salts of aromatic phosphoric acids, alkyl alcohols having a number of carbon atoms of 8 to 30, condensation products of a polyhydric alcohol and an aldehyde, and alkylamines. Examples are aluminum p-t-butylbenzoate, 1,3-benzylidenesorbitol, 1,3,2,4-dibenzylidenesorbitol, the di-substituted benzylidene-sorbitol represented by the following formula;

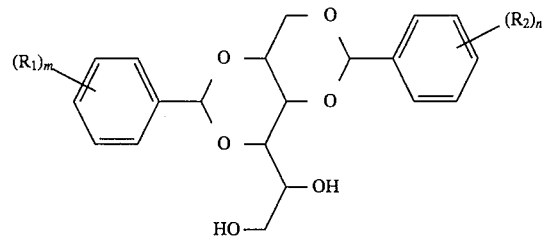

In the formula, $R_1$ and $R_2$ indicate an alkyl group or an alkoxy group having a number of carbon atoms of 1 to 8 or a halogen, and m and n are 0 to 3 and $m+n \geq 1$.

metal salts, such as calcium salt and magnesium salt, of stearyl lactic acid, the compounds, such as N-(2-hydroxyethyl)-stearylamine, represented by the following formula;

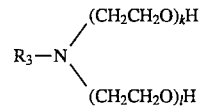

In the formula, $R_3$ indicates an alkyl group having a number of carbon atoms of 8 to 30, and k and l are 0 to 10 and $k+1 \geq 1$ metal sales, such as lithium salts sodium salt, potassium salt, calcium salt and magnesium salt, of 1,2-dihydroxystearic acid, stearyl alcohol, lauryl alcohol, sodium benzoate, benzoic acid, and sebacic acid.

Among the organic nucleating agent, sorbitol compounds are preferable.

Examples of the sorbitol compound are as follows:

di-(o-methylbenzylidene)sorbitol
o-methylbenzylidene-p-methylbenzylidene sorbitol
di-(m-methylbenzylidene)sorbitol
m-methylbenzylidene-o-methylbenzylidene sorbitol
di-(p-methylbenzylidene)sorbitol
m-methylbenzylidene-p-methylbenzylidene sorbitol
1.3-heptanylidenesorbitol
1.3,2.4-diheptanylidenesorbitol
1.3,2.4-di(3-nonyl-3-pentenylidene)sorbitol
1.3-cyclohexanecarbylidenesorbitol
1.3,2.4-dicyclohexanecarbylidenesorbitol
1.3,2.4-di(p-methylcyclohexanecarbylidene)sorbitol
Aromatic hydrocarbon groups or derivatives thereof
1.3-benzylidenesorbitol
1.3,2.4-dibenzylidene-D-sorbitol
1.3,2.4-di(m-methylbenzylidene)sorbitol
1.3,2.4-di(p-methylbenzylidene)sorbitol
1.3,2.4-di(p-hexylbenzylidene)sorbitol
1.3,2.4-di(1-naphthalenecarbylidene)sorbitol
1.3,2.4-di(phenylaceylidene)sorbitol
1.3.2.4-di-methylbenzylidene)sorbitol
1.3.2.4-di(ethylbenzylidene)sorbitol
1.3.2.4-di(propylbenzylidene)sorbitol
1.3.2.4-di(methylbenzylidene)sorbitol
1.3.2.4-di(ethoxybenzylidene)sorbitol
1.3.2.4-di(p-methylbenzylidene)sorbitol
1.3.2.4-di(p-chlobenzylidene)sorbitol
1.3.2.4-di(p-methoxybenzylidene)sorbitol
1.3.2.4-di(alkylbenzylidene)sorbitol 1.3.2.4-di(methylbenzylidene)sorbitol aluminum benzoate, etc.

Preferable nucleating agents are organic nucleating agent of dibanzylidenesorbitol compounds, and the di-substituted benzylidenesorbitol compositions described below are particularly preferable for the polyolefin resins, preferably homopolypropylene resin, propylene-α-olefin block copolymer resin, propylene-α-olefin random copolymer resin, homopolyethylene resin having a density of not less than 0.910 g/cm$^3$ and ethylene-α-olefin copolymer resin having a density of not less than 0.870 g/cm$^3$, which belong to crystalline resin which is preferable for the invention, in view of the improvement in Young's modulus, physical strength, rigidity and film molding speed, the decrease of molding troubles, and the improvement in foreign odor and blending out which are the defects of conventional organic nucleating agent.

The di-substituted benzylidenesorbitol composition contains solid powder of the dibenzylidenesorbitol derivative represented by the following general formula and the following higher fatty acid as the essential components, and the surface of the solid powder of the dibenzylidenesorbitol derivative is coated with the higher fatty acid.

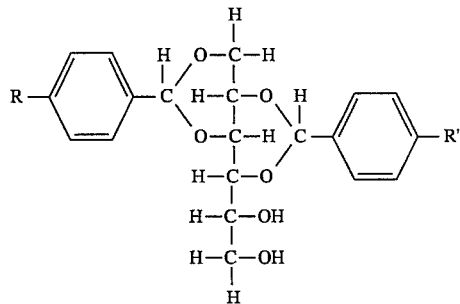

In the formula, R and R' independently represent an atom or a group selected from chlorine atom, methyl group and ethyl group, preferably chlorine atom or methyl group.

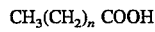

In the formula, n represents a number of 14 to 30, preferably 18 to 27, particularly preferably 20 to 25. Preferable dibenzylidenesorbitol derivatives of the above general formula are 1.3,2.4-di(p-methylbenzylidene)sorbitol, 1.3,2.4-di(p-ethylbenzylidene)sorbitol, 1.3-p-methylbenzylidene-2.4-p-chlorobenzylidenesorbitol, 1.3-p-methylbenzylidene-2.4-p-ethylenzylidenesorbitol, 1.3-p-chlobenzylidene-2.4-p-methylbenzylidensorbitol and the like. Particularly preferable dibenzylidenesorbitol derivatives are 1.3,2.4-di(p-methylbenzylidene)sorbitol, 1.3-p-methylbenzylidene-2.4-p-chlorobenzylidene sorbitol and 1.3-p-chlorobenzylidene-2.4-p-methylbenzylidensorbitol.

Preferable higher fatty acids are behenic acid, stearic acid and palmitic acid. Bahchic acid is the most preferable, and stearic acid is in the second place.

The particle size of the solid powder of the dibenzylidene sorbitol derivative is not particularly limited, but a particle size distribution of 30 to 100 mesh is preferred.

Preferable organic nucleating agent composition contains 95 to 50 parts by weight, preferably 90 to 50 parts by weight, of the dibenzylidenesorbitol and 5 to 50 parts by weight, preferably 10 to 50 parts by weight, of the higher fatty acid so that the total of both components is 100 parts by weight.

The di-substituted dibenzylidenesorbitol can be prepared by adding the solid powder of the dibenzylidenesorbitol derivative to an aqueous emulsion containing the higher fatty acid in the above ratio, stirring to form a coating layer of the higher fatty acid on the surface of the solid powder of the dibenzylildenesorbitol derivative, filtering out the dibenzylidenesorbitol derivative powder coated with the higher fatty acid, washing followed by drying. The above aqueous emulsion of the higher fatty acid is prepared by dispersing an organic solvent solution of the higher fatty acid in a concentration of 5 to 50 wt % preferably 10 to 50 wt. % into water together with a small amount, such as 1 to 10 parts by weight, preferably 2 to 5 parts by weight, of surfactant. The presence of the higher fatty acid coating formed on the surface of the solid powder of the dibenzylidene sorbitol derivative can be confirmed by coloring the coating using a dye and then observing.

The polyolefin resin, to which the di-substituted benzylidenesorbitol composition is blended as and additive in order to improve physical strength and to decrease bleeding out and odor, includes homopolymers and copolymers of aliphatic monoolefin having a number of carbon atoms of 2 to 6, such as homopolypropylene resin, low density homopolyethylene resin, high density homopolyethylene resin, linear polyethylene (ethylene-α-olefin copolymer) resin, ethylene-propylene copolymer resin and the like, having a number average molecular weight of 10,000 to 1,000,000, preferably 15,000 to 800,000, more preferably 20,000 to 600,000, particularly preferably 30,000 to 400,000. The blending effects of the organic nucleating agent are especially pronounced on a polyolefin resin having a high crystallinity, not less than 50 %, preferably not less than 70 %, more preferably not less than 80 %, particularly preferably not less than 90 %. A suitable molecular weight distribution (weight average molecular weight/number average molecular weight) is 2 to 20, preferably 3 to 15, more preferably 3.5 to 12, particularly preferably 4 to 10, measured by the GPC method.

A suitable blending amount of the di-substituted benzylidenesorbitol composition is 0.005 to 5 parts by weight, preferably 0.01 to 3 parts by weight, per 100 parts by weight of the polyolefin resin.

The di-substituted benzylidenesorbitol composition can be blended into the polyolefin resin by an arbitrary known blending means, and the blend prepared in a high concentration can be used as a masterbatch resin.

In the di-substituted benzylidenesorbitol composition, it is important that the surface of the solid particles of the dibenzylidenesorbitol derivative be coated with the higher fatty acids and the aforementioned effects cannot be obtained by mere blending of the dibenzylidene sorbitol derivative and the higher fatty acid.

Moreover, in order to obtain the aforementioned effects, a heat history of not less than 180° C., preferably not less than 190° C., particularly preferably not less than 200° C. is necessary. The heat history is sufficient by once. For example, the polyolefin resin composition is blended with 0.01 to 2 wt. % of the above di-substituted benzyltdenesorbitol composition, and pelletized with heating at a temperature not less than 180° C. preferably not less han 190° C. particularly preferably not less than 200° C. The pellets are used for molding a light-shielding polyolefin resin film or the like. Even when the molding resin temperature is less than 180° C., the aforementioned effects are obtained, by rendering the molding resin temperature not less than 180° C. (i.e. twice heat history of not less than 180° C.), the molded light-shielding polyolefin resin film is very excellent in physical properties and rigidity, has a high surface gloss and rare occurrence of wrinkling and streaks. In order to exhibit the blending maximum effect of nucleating agent, it is preferable to apply to polyethylene resins, preferably having a molecular weight distribution (weight average molecular weight/number average molecular weight) of 1.5 to 12, preferably 2 to 10, particularly preferably 2.5 to 7.

The di-substituted benzylidenesorbitol composition exhibits various advantages compared with conventional organic nucleating agent, such as not degrading various properties such as physical strengths bleeding out problem and rigidity, but occasionally improving the properties, being excellent in odorless property, resistance To wrinkling and streaks, improving in film moldability, film forming speed and decreasing of molding trouble, by blending with the polyolefin resin composition. That is, light-shielding molded articles for photographic photosensitive materials excellent in physical strength, rare bleeding out, odorless property, film moldability and wear resistance can be provided by blending the polyolefin resin composition of the invention with the di-substituted benzylidenesorbitol composition.

Although the reason why the di-substituted benzylidenesorbitol composition exhibits the above excellent effects is not clear, it can be considered that benzaldehyde, which is a raw material of conventional dibenzylidenesorbitol, and benzaldehyde derivatives such a p-substituted benzaldehyde, which is a raw material of the dibenzylidene sorbitol derivative of the invention, have odor, and a trace amount thereof unavoidably remains in dibenzylidenesorbitol or its derivative after purification to cause foreign odor of the light-shielding polyolefin resins and that a small amount of dibenzylidenesorbitol or its derivative is decomposed during molding the light-shielding polyolefin resin film to cause foreign odor. By satisfying the requirement of using the solid particles of the dibenzylidenesorbitol derivative of the aforementioned formula and coating them with the higher fatty acid of the aforementioned formula, the di-substituted benzylidenesorbitol composition exhibits the effect of sharply decreasing the foreign odor of the molded articles of the invention and the effect of improving the aforementioned various properties, such as rigidity and physical strength.

Various organic nucleating agents may be used as a nucleating agent or a combination of two or more organic nucleating agent. The surface of organic and/or inorganic nucleating agent may be coated with various lubricant, such as fatty acid, fatty acid compound or silicones coupling agent, plasticizer, dispersing agent such as surfactant, wetting agent or the like.

A suitable blending amount of nucleating agent is 0.005 to 5 wt. %, preferably 0.01 to 3 wt. %, more preferably 0.03 to 2 wt. %, particularly preferably 0.05 to 1 wt. % in total. When the blending amount is less than 0.005 wt. %, the blending effect is insufficient. When the blending amount exceeds 5 wt. %, the effect of the excess amount of the nucleating agent is minor. According to the kind of the nucleating agent, it adversely affects photographic photosensitive materials, generates noxious odor, adheres to mold, bleeds out, decreases dropping strength, or the like.

As the method of blending the nucleating agent, there are the compound method, the dry blending method, the masterbatch method, and the like, and the masterbatch method is preferred. It is preferable to blend at the time of producing coloring masterbatch, in view of cost and workability. Since the nucleating agent is bulky and tends to dust, to blend a small amount of dispersing agent or wetting agent is preferred. Suitable dispersing agents include various lubricants, various low molecular weight polyolefin resins having a weight average molecular weight of 500 to 10,000, various waxes, various carboxylic acid anhydrides, various higher fatty acids, etc., and lubricants such as various fatty acid metal various silicones salts, and oleic amide are particularly preferred. As the wetting agent, plasticizers such as DOP and DHP can be used.

It is also preferred to prevent the bleeding out by coating or blending a fatty acid or a fatty acid compound, such as a higher fatty acid, a fatty acid amide or a fatty acid metal salt onto or with the organic nucleating agent. Furthermore, the blending effect of the nucleating agent is improved by using it in the form of pellets formed by blending with a polyolefin resin having a heat history at not less than 180° C., preferably not less than 190° C., particularly preferably not less than 200° C. By blending these additives, physical strength is improved, white powder generation caused by abrasion can be decreased by increasing rigidity, and white powder generation caused by crystallization or bleeding out of the organic nucleating agent can also be decreased. Moreover, uncomfortable odor of the organic nucleating agent is prevented, and antistatic ability and antiblocking ability are improved. In this case, it is preferable to blend the aforementioned various antioxidant in order to prevent the degradation, oxidative decomposition and coloring of the above various dispersing agent and various thermoplastic resin.

Inorganic nucleating agent includes an alkali metal hydroxide, such as lithium hydroxide, sodium hydroxide and potassium hydroxide, an alkali metal oxide, such as sodium oxide, an alkali metal carbonate, such as lithium carbonate, sodium carbonate, potassium carbonate, sodium hydrogencarbonate and potassium hydrogencarbonate, an alkaline earth hydroxides such as calcium hydroxide, magnesium hydroxide and barium hydroxide, an alkaline earth oxide, such as calcium oxide, and an alkaline earth carbonate, such as calcium carbonate.

The nucleating agent is not limited to the above compounds, and any known nucleating agent may be employed. Moreover, two or more nucleating agents may be used simultaneously. A suitable blending amount of inorganic nucleating agent is 0.01 to 5 wt. %, preferably 0.05 to 3 wt. %.

In order to exhibit the effect of the nucleating agent, the kneading resin temperature of a crystalline resin, preferably a polyolefin resin is made not lower than 170° C., preferably not lower than 185° C., particularly preferably not lower the 195° C. A heat history of not less than 170° C. is preferably conducted once or more, particularly preferably twice or more (at least at pelletizing and at molding). It is preferable that the heat history is conducted in a state blended with antioxidant and/or radical scavenger.

It is preferable to combine various fatty acid metal salt with the aforementioned organic or inorganic nucleating agent. A suitable blending amount is 0.01 to 2 wt. %, preferably 0.03 to 1 wt. %, particularly preferably 0.05 to 5 wt. %.

The following additives may be added to the packaging material of the invention.
(1) Plasticizer; phthalic acid esters, glycol ester, fatty acid esters, phosphoric acid esters, etc.
(2) Stabilizer; lead compounds, cadmium compounds, zinc compounds, alkaline earth metal compounds, organic tin compounds, etc.
(3) Flame retardant; phosphoric acid esters, phosphoric acid ester halides, halides, inorganic materials, polyols containing phosphorus, etc.
(4) Filler; alumina, kaolin, clay, zeolite, calcium carbonate, mica, talc, titanium oxide, silica etc.

(5) Reinforcing agent; glass lobing, metallic fiber, glass fiber, glass milled fiber, carbon fiber, etc.
(6) Blowing agent; inorganic blowing agents (ammonium carbonate, sodium hydrogen carbonate), organic blowing agents (nitroso compounds, azo compounds) etc.
(7) Vulcanizing; vulcanization accelerator, acceleration assistant, etc.
(8) Deterioration preventing agent, ultraviolet absorber, metal deactivator, peroxide decomposing agent, etc.
(9) Coupling agent; silane compounds, titanium compounds, chromium compounds, aluminum compounds, etc.
(10) Various thermoplastic resins, polyolefin elastomers, rubbers.

The following plasticizer may be blended into the packaging material for photographic photosensitive materials in order to improve uniform dispersibility of the light-shielding material.
(1) Phthalic acid plasticizer
   dibutyl phthalate, diheptyl phthalate, dioctyl phthalate, diisodecyl phthalate, butyl lauryl phthalate, ditridecyl phthalate, butyl benzyl phthalate, butyl phthalyl butyl glycolate, etc.
(2) Phosphoric acid plasticizer
   tricresyl phosphate, trioctyl phosphate, etc.
(3) Fatty acid plasticizer
   tri-n-butyl citrate, dioctyl adipate, dioctyl azelate, dioctyl sebacate, methyl acetyl ricinoleate, etc.
(4) Epoxy plasticizer
   alkyl epoxy stearate, 4,5-epoxycetrahydrodiisodecyl phthalate, etc.
(5) Other plasticizer
   chlorinated paraffin, polyester, sucrose octacetate, etc.

A suitable blending amount of the plasticizer is 0.01 to 10 wt. %, preferably 0.05 to 7 wt. %, particularly preferably 0.1 to 5 wt. %. When the blending amount is less than 0.01 wt. %, the blending effects of the improvement in the uniform dispersibility of light-shielding material and in the blocking adhesion is insufficient. When the blending amount exceeds 10 wt. %, screw slip occurs in an extruder resulting in a variation in the amount of ejected resin.

As the deodorant, there are organic carboxylic acids, mixtures of organic carboxylic acid and zinc compound, mixtures of organic carboxylic acid, zinc compound and aluminum compound, etc.

The organic carboxylic acids include aliphatic polycarboxylic acids, aromatic polycarboxylic acids, acidic polyester compounds which are reaction products of the aliphatic or aromatic polycarboxylic acid and polyol compound and have a carboxyl group at terminal(s), etc. As the aliphatic polycarboxylic acids, there are various di-or tri-carboxylic acids, such as oxalic acid, malonic acid, succinic acid, adipic acid, fumetic acid, methylfumaric acid, maleic acid, methylmaleic acid, iraconic acid, acetylenic acid, malic acid, methylmalic acid, citric acid, isocitric acid, mesaconic acid, citraconic acid and their sales, and the like, and citric acid and fumeric acid and their salts are particularly preferred. As the aromatic polycarboxylic acids, there are phthalic acid, terephthalic acid, isophthalic acid, trimellitic acid pyromellitic acid, benzenehexatricarboxylic acid, naphthalene dicarboxylic acid, naphthalene tricarboxylic acid, naphthalene tetracarboxylic acid, azobenzene tetracarboxylic acid, and their anhydrides and the like, and benzene tricarboxylic acid and trimellitic acid are particularly preferred. As the acidic polyester compound having a carboxylic group at a terminal, there are polyesters having a terminal carboxyl group produced by the reaction of polycarboxylic acid such as phthalic acid with polyol such as ethylene glycol or diethylene glycol, acidic cellulose derivatives modified with polycarboxylic acid, and the like.

The zinc compound combined with the organic carboxylic acid includes zinc oxide, inorganic zinc salts, such as zinc chloride, zinc sulfate, zinc phosphate and zinc carbonate, and organic zinc salts, such as zinc citrate and zinc fumarate. A suitable mixing ratio of organic carboxylic acid: zinc compound is 1:0.1–3 by weight ratio.

The aluminum compound combined with the organic carboxylic acid and the zinc compound includes aluminum sulfate and potassium alum, and a suitable mixing ratio of organic carboxylic acid: zinc compound: aluminum compound is 1:0.1:0.1 to 1:3:3 by weight ratio.

Other deodorants applicable to the invention are combinations of a ferrous compound or a ferrous salt and L-ascorbic acid, combinations of a ferrous compound and L-ascorbic acid and alum, metallophthalocyanine, activated carbon fiber, metalloporphyrins, aliphatic polycarboxylic acids, such as tricarboxylic acids, citric acid, oxalic acid, malonic acid, lalic acid and succinic acid, composite materials containing organic acid as the base material ("Daimushu" Dai Nippon Seika Kogyo), activated carbon, natural Organic materials extracted from plant, such as flavanol, flavanol analogs and organic polymers, polyphenols, cellulose acetate impregnated with glyoxal, combinations of a hydroxy carboxylic acid compound and a ferrous salt, combinations of a hydroxy carboxylic acid compound having two or more carboxyl groups and a ferrous salt and a sulfate or sulfite, combinations of an hydroxy carboxylic acid and L-ascorbic acid and a ferrous salt, combinations of ascorbic acid and humic acid and an iron salt, combinations of iron and ascorbic acid, iron compounds, inorganic acid iron salts, organic acid iron salts, combinations of citric acid and iron oxide and silicic acid and aluminum and calcium and potassium, cristobalite, sodium aluminosilicate (zeolite), sulfates, chlorides, nitrates and acetates of Cu, Zn, Al, Fe, Ni, Sn, Pb, Ti, Mn, Co or Ag. The above deodorants may be combined.

A suitable blending amount of the deodorant is selected from the range of 0.01 to 30 wt. % according co the kind, form and composition of the flexible sheet. A preferable blending amount is 0.05 to 20 wt, %, particularly preferably 0.1 to 10 wt. %.

It Is preferable to use the deodorant as a deodorizing flexible sheet prepared by incorporating the deodorant into various flexible sheets. Preferable flexible sheets are cellophane, various films, papers, adhesive layers, metal foils, metallized flexible sheets, nonwoven fabrics, foamed sheets, fibers and rubber sheet, coated, impregnated, kneaded and/or deposited with the deodorant. Although the thickness of the deodorizing sheet is not specifically limited, a suitable thickness is 1 to 100 μm, preferably 10 to 50 μm in the case of adhesive layers, 1 to 50 μm converted to the thickness of the deodorant alone in the case of spray coating, solution coating, powder spraying or electrostatic adsorption, and 6 μm to 3 mm, preferably 10 to 500 μm, in the case of usual flexible sheets, in view of bag-making ability, laminating ability, cost deodorizing ability and the like. The thickness greatly varies according to the concentration of the deodorant and the density of the flexible sheet. In any event, an excessive thickness results in an excessive rigidity as a packaging bag, an inferiority of bag-making ability and a high cost.

As the oxygen scavenger, there are sulfites, hydrogen sulfites, dithionates, hydroquinone, catechol, resorcin, pyrogallol, gallate, ascorbic acid, ascorbate, isoascorbic acid, isoascorbate, glucose, lignin, dibutylhydroxytoluene, butylhydroxyanisole, ferrous salts, metal powders such as iron powder, carbon dioxide-generating type oxygen scavengers carbon dioxide-absorbing type oxygen scavengers, cristobalite, zeolite, hydrosulfite, glucose oxidase, safcosine, alkali metal sulfides, alkali carbonates, sodium thiosulfate, sodium alum, disodium hydrogen phosphate.12 hydrates, hydrous sodium silicate, hydrous sodium borate, ferrous silicate sulfate.7 hydrates, activated clay, mordenite, and the like. The oxygen scavenger may be used as a single material or a combination of them. Preferable oxygen scavengers are those containing hydrosulfite as the principal component, those containing organic material such as L-ascorbic acid as the principal component, those containing iron powder as the principal component, mixture compositions of iron and at least one material selected from the group consisting of ferrous silicate sulfate.7 hydrate, sodium alum, disodium hydrogen phosphate.12 hydrates, hydrous sodium silicate and hydrous sodium borate, hydrosulfite and calcium hydroxide or sodium bicarbonate and activated carbon, iron powder, accelerating salt and hydrous material, oxidizable metal powder and sodium thiosulfate and solid reaction assistant, iron powder and sodium thiosulfate and activated carbon, activated iron oxide, metal oxides, palladium, sugars, enzymes, and the like.

As the moisture absorber, there are water-absorptive resins containing carboxyl group, alkali metal salts of crosslinking polyacrylate, ethylene copolymer resins containing carboxyl group, alkali metal salt of acrylate-graft starch crosslinking agent, crosslinked polyvinyl alcohol-alkali metal salt of acrylate copolymer, crosslinked polyvinyl alcohol-maleic anhydride copolymer, modified celluloses, water-soluble polymer crosslinking agent, self-crosslinking type alkali metal salt of acrylate copolymer, polyacrylic acid and alkali salts thereof, polyacrylamide and partial hydrolyzate thereof, polyvinyl pyrrolidone, sulfonated polystyrene, polyacrylamide-2-methylpropane sulfonic acid sodium salt, graft copolymer of starch-acrylonitrile and hydrolyzate thereof, hydrolyzate of polyacrylonitrile, copolymer of acrylamide and acrylic acid, carboxymethyl cellulose, vinyl styrene sulfonic acid, Mannich reaction product of polyacrylamide, polyacrylamine, dimethylaminoethylmethacrylate homopolymer and copolymer thereof with acrylamide, homopolymer of quaternary ammonium salt of dimethylaminoethylmethacrylate produced by methyl chloride and copolymer thereof with acrylamide, quaternary ammonium salt of polydimethylallylamine, polymer of quaternary vinyl benzylamine, acetylating agent of chitosan, condensation product of epichlorohydrin and polyvalent amine or monoamine, resin prepared by adsorbing polyamide polyamine epichlorohydrin thermosetting resin on the surface of high water-absorptive resin beads followed by thermosetting, copolymer of hydrophilic vinyl monomer (acrylamide derivative, etc.) and hydrophobic vinyl monomer (methacrylate derivative, etc.), sodium salt of isobutylene-maleic anhydride copolymer, sodium salt of starch and acrylic acid and acrylic acid derivative graft copolymer, partially crosslinked carboxymethyl cellulose-polybasic acid, partially crosslinked polyacrylic acid, surface-coated high water-absorptive polymer, blends of high water-absorptive polymer and inorganic material (attapulgite, kaolin, talc, diatomaceous earth, etc.), mixture of high water-absorptive resin having anionic dissociative group and high water-absorptive resin having cationic dissociative group, starch-acrylic acid-sodium acrylate copolymer, starch-sodium acrylate copolymer, activated carbon, silica gel, calcium chloride, etc. Preferable moisture absorbers are produced from starch, cellulose or synthetic polymer having a great water absorbability. Preferable water-absorptive resins have a water-absorbing power of not less than 30 g/g, preferably not less than 50 g/g, more preferably not less than 80 g/g, particularly preferably not less than 100 g/g.

It is preferable to add inorganic material having ion-exchange ability in order to adsorb gases which adversely affect photographic properties of photographic photosensitive materials to render harmless, to improve dispersibility by combining light-shielding material, to react with unfavorable odor substances to render them odorless. As the inorganic material having ion-exhange ability, there are ① various zeolite including natural zeolite, such as analcime, erionite or mordenite, and synthetic zeolite in a type of A, N-A, X, Y, hydroxy sodalite, B, R, T, hydroxy cancrinite or the like, having a mean particle size of 0.1 to 7 μm, preferably 0.1 to 5 μm, particularly preferably 0.1 to 3.5 μm, and a suitable content in the resin composition being 0.1 to 10 wt. %, preferably 0.2 to 8 wt. %, particularly preferably 0.3 to 6 wt. %, and providing various effects, such as the improvement in dispersibility, deodorization and adsorption of gases harmful to photographic properties, by combining light-shielding material, ② diatomaceous earth, ③ activated clay, ④ synthetic aluminum silicate, ⑤ synthetic calcium silicate, ⑥ synthetic magnesium silicate, ⑦ mica, ⑧ chelating material, etc. Examples of the chelating material are carboxylic acid-type phthalocyanine metal complex, such as metal phthalocyanine tetracarboxylic acid and metal phthalocyanine octacarboxylic acid, iminodiacetic acid-type chelate resin, aminocarboxylic acid-type chelate resin (ethylenediamine-tetraacetic acid (EDTA), etc.), polyamino-type chelate resin, glucamine-type chelate resin, carrier-type chelate resin, 4-dimethylamino-2.6-pyridine dicarboxylic acid chelate resin, and the like. A suitable blending amount of the inorganic material having ion-exchange ability is 0.01 to 10 wt. %, preferably 0.05 to 8 wt. %, more preferably 0.1 to 6 wt. %. When the blending amount is less than 0.01 wt. %, the blending effect is insufficient. When the blending amount exceeds 10 wt. %, the effect obtained by the excess amount is small. Moreover, the decrease of physical strength and the degradation of appearance occur.

The agent imparting fragrance are natural fragrant components, such as ethereal oil of lilac flower, jasmin, abies oil, cinnamon oil, lavender oil and lemon oil, and synthetic fragrant components, such as geraniol, eugenol, n-octyl alcohol, carbitol, cis-jasmone, lemon terpene, menthone, methylsalicylate, methylphenylcarbinol, triethyl titrate, pulenyl benzoate, methyl benzoate, benzyl benzolate, citral, d-limonene, ethylcinnamate, alkylene glycol, benzylsalicylate, linalool, vatillin, coumarin, methyl naphthyl ketone and rose phenone, which are used by encapsulation to form microcapsules or entrapping by cyclodextrin, maltosyl cyclodextrin, zeolite, starch, talc or the like.

One or more of the oxygen scavenger, deodorant, moisture absorber, the agent imparting fragrance or inorganic material having ion-exchange ability (including chelating material, and a suitable content is 0.01 to 30 wt. %, preferably 0.05 to 20 wt. %, more preferably 0.1 to 10 wt. %. When the content is less than 0.01 wt. %, the blending effect is not realized. When the content exceeds 30 wt. %, photographic photosensitive materials are adversely affected as well as the material cost is increased.

A preferable light-shielding bag for photographic photosensitive materials can be formed by using a laminate having the following construction. That is, at least one of the above oxygen scavenger, deodorant, moisture absorber, the agent imparting fragrance, inorganic material having ion-exchange ability and chelate material is incorporated into the cushioning sheet having a density of not more than 0.5 g/cm³ or an adhesive layer in an amount of 0.01 to 30 wt. %. The wear-resistant heat-resistant flexible sheet having a Young's modulus of not less than 50 kg/mm² provided on the outside of the cushioning sheet is a single layer sheet or a composite laminated sheet including coextruded multi-layer film, having an oxygen permeability measured by the MOCON method (A uniform pressure method according to ASTM D-3985) of not more than 50 cc/m².24 hr.1 atm.20° C., particularly preferably not more than 35 cc/m².24 hr.1 atm. 20° C., particularly preferably not more than 20 cc/m².24 hr.1 atm 20° C., and a moisture permeability measured by the cup method (40° C., 90% RH) of JIS Z-0208 of not more than 10 g/m².24 hr, preferably not more than 5 g/m².24 hr, particularly preferably not more than 2 g/m².24 hr. The water-resistant flexible sheet having a Young's modulus of not less than 50 kg/mm² provided on the other side, i.e. photographic photosensitive material side, of the cushioning sheet is a single layer sheet or a composite laminated sheet including coextruded multilayer film, having an oxygen permeability and a moisture permeability greater than those of the wear-resistant heat-resistant flexible sheet by not less than 10%, preferably not less than 20%, more preferably not less than 40%, particularly preferably not less than 100%. By using the above laminate, the light-shielding bag can keep the photographic properties of photographic photosensitive materials for a long period in excellent condition, does not add uncomfortable feeling to users at the time of use, and has a high commercial value.

Taking into consideration the case of reclamation treatment as waste, degradable plastic which is being developed or has already introduced in the market can be used. For example, a biodegradable polymer of "BIOPOL" (ICI), "Polycaprolactone" (UCC) or the like is utilized, or a polymer indirectly collapsed by blending a biodegradable natural or synthetic polymer as an additive, such as polyethylene blended with starch, can be utilized. In order to improve industrial water treatment, it is also preferable to blend a recently commercialized synthetic biodegradable plastic which can be decomposed up to carbon dioxide and water by the action of microoragnisms ("Bionol", Shows Polymer, which is a special polyester resin synthesized from dicarboxylic acid and the like, a polymer alloy of modified polyvinyl alcohol having biodegradability and maize starch) in an amount of not less than 10 wt. % of the resin composition for the molded article of the invention. In the case of a multilayer molded article, it is preferable so that the layer(s) which do not contact directly photographic photosensitive materials contain not less than 50 wt. % of the above biodegradable plastic in view of the improvement in industrial waste treatment.

Moreover, it is also possible to utilize a photodegradable polymer, such as ELO copolymer wherein carbonyl groups are introduced into The main chain as a photosensitization group at the time of polymerization of ethylene, i.e. copolymerization of ethylene and carbon monoxide, polymers to which photodegradabtlity is imparted by adding transition metal salt, oxidation accelerator, photosensitizer or the like to base polymer. It is also possible to combine degradable polymers, such as biodegradable polymer, photodegradable polymer and water-soluble polymer (Japanese Patent KOKAI No. 3-129341). When recycling is taken into consideration, it is preferable no form all of the cushioning sheet, the wear-resistant flexible sheet having a Young's modulus of not less than 50 kg/mm² and optional adhesive layer(s) by polyolefin resin, preferably similar polyethylene resins. In the case of incineration treatment, it is preferable to blend calcium carbonates clay, titanium dioxide or the like in an amount of 0.1 to 60 wt. %, preferably 0.5 to 50 wt. %, particularly preferably 1 to 30 wt. %, in order to inhibit heat generation.

The packaging material for photographic photosensitive of the invention is manufactured by laminating the cushioning sheet having a density of not more than 0.5 g/cm³, the wear-resistant heat-resistant flexible sheet onto one side of the cushioning sheet, the wear-resistant flexible sheet onto the other side of the cushioning sheet, and an optional metallic layer and also optional various flexible sheet(s) directly or through an adhesive layer.

The adhesive used as the adhesive layer is selected by considering both layers to be joined, and includes thermoplastic resin melt adhesives extrusion laminating type adhesive, hot melt type gum adhesives and solution type adhesives. The thermoplastic resin melt adhesives are polyolefin resin adhesives, such as various polyethylenes (LDPE, MDPE, HDPE), polypropylenes, and polybutenes, ethylene copolymer resins, such as ethylene-propylene copolymer resins, L-LDPE resins, ethylene-vinyl acetate copolymer resins, ethylene-ethylacrylate copolymer resins, ethylene-acrylic acid copolymer resins, various ionomers ("SURLYN" Dupont, "HIMIRAN" Mitsui Polychemicals Co., LTd., etc.) and acid-modified resins. The solution type adhesives are divided into adhesives for wet laminating and adhesives for dry laminating. The adhesives for wet laminating are emulsion-type or latex-Type. Examples of the emulsion-type adhesives are polyvinyl acetate emulsion, the emulsion of vinyl acetate-ethylene copolymer, the emulsion of vinyl acetate-acrylate ester copolymer, the emulsion of vinyl acecate-maleate ester copolymer, the emulsion of acrylic copolymer and the emulsion of ethylene-acrylic acid copolymer. Examples of the latex-type adhesives are natural rubber latex, styrene-butadiene rubber (SBR) latex, acrylonitrile-butadiene rubber (NBR) latex and chloroprene rubber (CR) latex. Examples of the adhesives for dry laminating are isocyanate adhesive and polyurethane adhesive. Adhesives for hot melt laminating containing paraffin wax, microcrystalline wax, ethylene-vinyl acetate copolymer and ethylene-ehtylacrylate copolymer, pressure-sensitive adhesives, temperature-sensitive adhesives and UV-curing type adhesives may also be employed.

Preferable adhesives are extrusion laminating type polyolefin resin adhesives, and LDPE resin and L-LDPE resin are particularly preferable because of being excellent in laminating properties as well as inexpensiveness. In the case of improving adhesive strength, acid-modified resins are preferable. Blend resins are also particularly preferable because of compensating defects of respective resins by blending two ore more of the above resins. Particularly, an arbitrary adhesive strength can be obtained by blending acid-modified polyolefin resin with LDPE resin or L-LDPE resin at a suitable blending ratio.

The thickness of the adhesive layer formed by extrusion laminating using a thermoplastic resin is usually 6 to 100 μm, preferably 7 to 50 μm, more preferably 9 to 40 μm, particularly preferably 10 to 30 μm. However, the thickness is determined based upon cost, laminating speed, thickness of the total layers, and etc., and accordingly, the thickness is not limited to the above range.

When physical strength is improved, such as tear strength in both the longitudinal direction and the lateral direction, impact puncture strength and Gelbo test strength, the adhesive layer is made a weakly joining layer having an adhesive strength of not more than 300 g/15 mm in width, preferably not more than 100 g/15 mm in width, particularly preferably not more than 50 g/15 mm in width as the delamination resistance between two layers laminated (at a peeling test at 180 degrees using a tester of ASTM D-903). On the other hand, it is necessary to have a strength so that the laminate is not separated through a bag-making process and a laminating process, and the delamination resistance is not less than 0.1 g/15 mm width, preferably not less than 1 g/15 mm width, particularly preferably not less than 5 g/15 mm width. In the case of 30 mm width, the delamination resistance doubles. The weakly joining layer can be formed by ① reducing the thickness of the adhesive layer, ② not providing a surface treatment, such as corona discharges flame treatment, plasma treatment, UV irradiation, electron beam irradiation, preheating or anchor coating, ③ lowering the temperature of the adhesive layer ④ using an adhesive composed of a resin composition having a weak adhesive strength, ⑤ using an adhesive composed of two or more resin compositions having poor compatibility, ⑥ using a coextruded multilayer extrusion laminating adhesive layer liable to be delaminated, or a combination of the above methods.

In the case that the packaging material is used for an easily openable package for photographic photosensitive materials or the case that delamination is prevented, the adhesive layer is made a strongly joining layer having an adhesive strength of not less than 350 g/15 mm width, preferably not less than 500 g/15 mm width, particularly preferably not less than 700 g/15 mm width, as the above delamination resistance. The strongly joining layer can be formed by conducting conversely to the case of the weakly joining layer. As a resin for forming the strongly joining layer, there are acid-modified resins.

Acid-modified polyolefin resin is a modified resin of polyolefin resin graft-modified with unsaturated carboxylic acid compound, and includes graft-modified polyethylene resin, graft-modified ethylene-ethyl acrylate copolymer resin, graft-modified ethylene-vinyl acetate copolymer resin, graft-modified polypropylene resin, graft-modified poly-α-olefin resins, such as polybutene-1 resin and poly-4-methylpentene-1 resin, and ethylene-α-olefin copolymer resins graft-modified with unsaturated carboxylic acid compound. Graft-modified polyolefin resins grafted with an unsaturated carboxylic acid compound, such as acrylic acid, maleic acid or maleic anhydride, are preferred. A suitable grafting rate of the unsaturated carboxylic acid compound is 0.01 to 10 %.

The unsaturated carboxylic acid compound usable as the modifier of the polyolefin resin is acrylic acid, methacrylic acid, crotonic acid, isocrotonic acid, fumaric acid, maleic acid, itaconic acid, citraconic acid, angelic acid, tetrahydrophthalic acid, sorbic acid, mesaconic acid, nudic acid (end-cis-bicyclo[2,2,1]-hepto-5-en-2,3-dicarboxylic acid), maleic anhydride, itaconic anhydride, citraconic anhydride, aconitic anhydride, methyl acrylate, methyl methacrylate, ethyl methacrylate, ethyl acrylate, n-butyl acrylate, glycidyl acrylate, glycidyl methacrylate, glycidyl maleate n-butyl methacrylate, maleic acid monoethyl ester, maleic acid diethyl ester, fumaric acid monomethyl ester, fumaric acid dimethyl ester, itaconic acid diethyl ester, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide malemide, N-butylmaleimide, N-phenylmaleimide, malonyl chloride, monomethylmaleate, dimethylmaleate, dipropylmaleate, potassium acrylate, sodium acrylate, zinc acrylate, magnesium acrylate, calcium acrylate, sodium methacrylate, potassium methacrylate, or the like. Two or more unsaturated carboxylic acid compounds may be combined. Preferable unsaturated carboxylic acid compounds are acrylic acid, maleic acid, maleic anhydride and nudic acid, and maleic anhydride is particularly preferred. A suitable amount of the unsaturated carboxylic acid compound is 0.01 to 20 parts by weight, preferably 0.2 to 5 parts by weight, per 100 parts by weight of the polyolefin base resin in view of securing adhesive strength.

The grafting modification method may be any known method, such as the method of reacting in a melted state disclosed in Japanese Patent KOKOKU No. 43-27421, the method of reacting in a solution state disclosed in Japanese Patent KOKOKU No. 44-15422, the method of reacting in a slurry state disclosed in Japanese Patent KOKOKU No. 43-18144 and the method of reacting in a vapor state disclosed in Japanese Patent KOKOKU No. 50-77493. Among them, the melting method using an extruder is preferred because of simple operation and inexpensiveness.

A peroxide is added in order to accelerate the reaction between the polyolefin base resin and the unsaturated carboxylic acid, Suitable peroxides are organic peroxides such as benzoyl peroxide, lauroyl peroxide, dicumyl peroxide, α,α'-bis(t-butylperoxydiisopropyl)benzene, 2,5-dimethyl-2,5-di(t-butylperoxy)hexane, 2,5-dimethyl-2,5-di(t-butylperoxy)hexyne, di-t-butyl peroxide, cumene hydroperoxide, t-butyl-hydroperoxide, t-butylperoxylaurate, t-butylperoxybenzoate, 1,3-bis(t-butylperoxyisopropyl) benzene, di-t-butyl-diperoxyphthalate, t-butylperoxymaleic acid and isopropyl percarbonate, azo compounds such as azobisisobutyronitrile, and inorganic peroxides such as ammonium persulfate. Two or more peroxides may be combined. Particularly preferred peroxides are di-t-butylperoxide, dicumylperoxide, 2,5-dimethyl-2,5-di(t-butylperoxy)hexane, 2,5-dimethyl-2,5-di(t-butylperoxy) hexyne, 1,3-bis(t-butylperoxyisopropyl)benzene and the like, which have a decomposition temperature between 170° C. and 200° C. A suitable amount of the peroxide is 0.005 to 5 parts by weight, preferably 0.01 to 1 part by weight per 100 parts by weight of the polyolefin base resin.

There are commercial adhesive polyolefin resins, such as "N polymer" (Nippon Petrochemicals), "Admer" (Mitsui Petrochemical Industries), "ER Resin" (Showa Denko), "Novatec-AP" (Mitsubishi Chemical Industries), "Modic" (Mitsubishi Petrochemical), "NUC-Ace" (Nippon Unicar), "Ube Bond" (Ube Ind.), "Bondain" (Sumitomo Chemical), "Melcene M" (Toso), "CMPS" (Mitsui Polychemicals), etc.

A suitable blending amount of the acid-modified polyolefin resin in the adhesive layer is 3 to 90 wt. %, preferably 5 to 70 wt. %, more preferably 7 to 60 wt. %, particularly preferably 10 to 50 wt. %. A blending amount of not less than 3 wt. % scarcely exhibits the effect on the improvement in adhesive strength. A blending amount of more than 90 wt. % does not exhibit a further improvement by the excess amount.

The adhesive layer may be blended with various known additives, and preferable additives are light-shielding material, deodorant, the agent imparting fragrance, oxygen scavenger and the like.

The light-shielding bag for photographic photosensitive materials of the invention is prepared by joining through fusion the layer having heat sealability of the packaging material for photographic photosensitive materials.

The form of the light-shielding bag for photographic photosensitive materials is not limited, and includes single sheet flat bag, double sheet flat bag, single sheet gusset bag and the like. As the joining method by fusion, there are the hot plate sealing, impulse sealing, ultrasonic sealing, high frequency sealing and the like.

The packaging material of the invention and the light-shielding bag using it may be provided on the surface of the wear-resistant heat-resistant flexible sheet with letters and marks which are required on the functional view point or with print in order to improve the value as commercial goods, such as bar code, CI mark, trade name, instructions, discrimination marks for goods, colors for discriminating goods and the like. Besides, a coating layer may be provided on the whole or a partial surface in order to improve printability, wear resistance, the value as commercial goods or the like. The ink used for printing them can be selected from harmless inks to photographic photosensitive materials among conventional inks for offset printing, inks for gravure printing or UV inks. The paint used for the coating layer of various resins or lacquers, UV-curing resis, electron beam-curing resins, etc.

Representative synthetic resins used or the inks or the coating layers are copolymer resins of which the principal component is vinyl chloride, vinyl amino resin, alkyd vinyl resin, oil-free alkyd resin, vinylchloride-vinylacetate copolymer resins, nitrocellulose, polyester resin, polyamide resin, polyurethane resin, polyacrylic resin, ethylene-vinyl acetate resin, vinyl ether resin, urethane vinyl acetate resin, vinylchloride-vinylacetate copolymer urethane resin, modified alkyd resin, melamine alkyd resin, modified phenol resin, alkali-soluble resins (rosin-modified maleic acid resin, styrene-maleic acid resins styrene-acrylic acid resin, acrylate ester-acrylic acid resin, methacrylate ester-acrylic acid resin), hydrosol type resins (styrene-maleic acid resin, styrene-acrylic acid resin, -methylstyrene-acrylic acid resin, acrylate ester-acrylic acid resin, methacrylate ester-acrylic acid resin), emulsion type resins (styrene resin, styrene-acrylate ester resin, acrylate eater copolymer resins, methacrylate ester copolymer resins), and the like. As the resins used for UV ink, polymers having acrylic unsaturated groups are, in general, used, and representative examples are polyester/acrylate ester, polyester/urethane resin/acrylate ester, epoxy resin/acrylate ester, pentaerythritol triacrylate, trimethylol propane triacrylate, hexanediol diacrylate, neopentylglycol diacrylates triethylene glycol diacrylate, hydroxyethyl methacrylate, etc.

Coloring pigments generally known are used for the above inks and coating solutions for the coating layer. The coloring pigments include various pigments disclosed in Japanese Patent KOKAI No. 63-44653, etc., azo pigments, (Azo Lake, Carmine 6B, Red 2B, insoluble azo pigments, Monoazo Yellow (PY-1,-3), Disazo Yellow (PY-12,-13,-14, -17,-83), Pyrazolo Orange (PO-B-34), Vulcan Orange (PO-16), condensed azo pigments, Chromophthal Yellow (PY-93,-95), Chromophthal Red (PR-144,-166)), polycyclic pigments (phthalocyanine pigments, Copper Phthalocyanine Blue (PB-15,-15 1,-15 3), Copper Phthalocyanine Green (PG-7)), dioxane pigments (Dioxane Violet (PV-23)), isoindolinone pigments (Isoindolinone Yellow (PY-109,-110)), durene pigments, perillene, perinone, flaventhrone, thoindigo, lake pigments (Malachite Green, Rhodamine B, Rhodamine G, Victoria Blue B), inorganic pigments, such as oxides (titanium dioxide, red ion oxide), sulfates (precipitated barium sulfate), carbonates (precipitated calcium carbonate), silicates (hydrous silicates, anhydrous silicates), metal powders (aluminum powder, bronze powder, zinc powder), carbon black, lead yellow, Berlin blue, and the like. These pigments may be added to the aforementioned resin layers or the like as a light-shielding material. In addition, oil-soluble dyes, disperse dyes, and the like are also usable. Other raw materials composing the ink which are optional are various solvent, dispersing agent, wetting agent, antifoamer, leveling agent, thickener,. stabilizer, crosslinking agent, wax and the like. It is also preferable co coat the synthetic resins or coloring pigments used for the ink composition for printing as the paint for the coating layer onto the surface the packaging material and the light-shielding bag using it for the purpose of the improvement in the value as commercial goods, printability, wear resistance, light-shielding ability, photographic properties and the like. The thickness of the printing ink and the coating layer may be freely set according to coating system and coating object, and the thickness is preferably set in view of the total evaluations of photographic properties, economical viewpoint, the value as commercial goods and the like. Various paint for forming coating layer may be coated as the base coating or the top coating in order to improve the value as commercial goods, to made the print of the printing ink fine and sharp. The resin and pigment for the paint may be selected from the aforementioned ones for printing ink, and UV paints, melamine alkyd paints, urethane paints and melamine paints are preferable. As the top coating, it is preferable to coat a clear lacquer, a silicone paint, an urethane paint or an acrylic lacquer paint in a thickness of 0.1 to 30 μm, preferably 0.3 to 20 μm, particularly preferably 0.5 to 10 μm.

The packaging material for photographic photosensitive materials of the invention may be used for packaging photographic photosensitive materials in various form as well as the above light-shielding bag. For example, the packaging material can be used for shrink packaging, assembly packaging, light-shielding bags of a package of sheet films for light room loading disclosed in Japanese Patent KOKAI No. 63-287848, Utility Model KOKAI Nos. 56-40535, 57-121941, 57-121942, etc., films for packaging X-ray films used for dentist disclosed in Japanese Utility Model KOKOKU Nos. 61-20593, 63-15872, 3-36993, 3-42437, Japanese Utility Model KOKAI Nos. 63-78948, 63-200837, etc. As other uses, there are substitutions for the light-shielding paper of a roll of photographic film (110 size, 126 size, 120 size, 220 size), light-shielding materials, such as a guide, in packages of a roll of photosensitive materials for daylight loading disclosed in Japanese Utility Model KOKAI Nos. 59-55756, 60-13386, 60-26051, 60-167796, 63-6449, 63-6452, 3-47547, 3-54937, 3-86358, 3-96648, Japanese Utility Model KOKOKU No. 2-6444, U.S. Pat. No. 4,911,299, Japanese Patent KOKAI No. 2-72347, light-shielding materials of packages of photosensitive materials disclosed in Japanese Utility Model KOKAI Nos. 3-43651, 3-53243, and the like.

The packaging material for photographic photosensitive materials of the invention is applicable to the following photosensitive materials.

Silver halide photographic photosensitive materials: films for printing, color and monochrome photographic printing papers, color and monochrome films, master papers for printing, DTR (diffusion transfer process) photosensitive materials, films and papers for computerized type-setting system, color and monochrome positive films, color reversal films, microfilms, films for movie, self-developing type photographic photosensitive materials, direct positive films and papers, etc.

Heat developing photosensitive materials: heat developing color photosensitive materials, heat developing monochromatic photosensitive materials, e.g. disclosed in Japanese Patent KOKOKU Nos. 43-4921, 43-4924, "Shashinkogaku-no-Kiso (Fundamentals of Photographic Engineering), Vol. Silver Salt Photograph", pp 553–555, Corona, 1979, "Research Disclosure", pp 9–15 (RD-17029), June, 1978, transfer-type heat developing color photosensitive materials disclosed in Japanese Patent KOKAI Nos. 59-12431, 60-2950, 61-52343, U.S. Pat. No. 4,584,267, etc.

Photosensitive heatsensitive recording materials: recording materials using photothermography (photosensitive heatsensitive image forming method) disclosed in Japanese Patent KOKAI No. 3-72358.

Diazonium photographic photosensitive materials: 4-morpholinobenzene diazonium microfilms, microfilms, copying films, form plates for printing, etc.

Azide, diazide photographic photosensitive materials: photosensitive materials containing parazidobenzoate, 4,4'-diazidostilbene, etc., such as copying films and form plates for printing etc.

Quinone diazide photographic photosensitive materials: photosensitive materials containing ortho-quinone diazide compounds or ortho-naphthoquinone diazide compounds, such as benzoquinone-(1,2)-diazido-(2)-4-sulfonic acid phenyl ether, such as form plates for printing, copying films and contact printing film, etc.

Photo polymers: photosensitive materials, form plates for printing, contact printing films, containing vinyl compound monomer, etc.

Polyvinyl cinnamate esters: printing films, photoresists for IC, etc.

Moreover, the packaging material of the invention is also applicable to various photosensitive materials degraded or denatured by light, oxygen, sulfur dioxide gas or the like, such as foods including peanuts with butter, margarine, snacks, relishs, cakes, teas and lavers, medicines including powder and granular medicines placed in a bag for stomach and bowels and for cold, dyes, pigments, photographic developing agent, photographic fixing agent, toners and the like.

In the packaging material for photographic photosensitive materials of the invention, the wear-resistant heat-resistant flexible sheet resist the heat through heat sealing of the layer having heat sealability.

By applying the light-shielding bag formed of the packaging material for photographic photosensitive materials of the invention to rolls of a photographic positive film for movie, the light-shielding bag can package the roll of a photographic positive film irrespective of its length by using the packaging material having the same laminate construction by merely changing the sealing size, and a conventional metal can can be omitted. Nevertheless the packaging material contains the cushioning sheet, high speed automatic bag-making is possible resulting in the reduction of the cost of the bag by 70% due to no occurrence of curling and limiting the difference of heat resistance (melting point or Vicat softening point) between the wear-resistant heat-resistant flexible sheet and the wear-resistant flexible sheet by not less than 40° C. Packaging work and process can be simplified, because of omitting the metal can and of automatic bag-making and automatic packaging. Handling, such as opening and taking out of a roll of photographic film is facilitated. It is possible to convey a large number of the package of a roll of photographic film once by a machine, and physical properties are improved. The package can be used as a shipping package to decrease physical distribution cost, that is, the volume of the package can be decreased without reducing the protectability for the product by the development of the strong light-shielding bag to omit the metal can.

Preferable embodiments of the packaging material and the light-shielding bag of the invention are as follows:

1. A packaging material for photographic photosensitive materials consisting essentially of a cushioning sheet having a density of less than 0.5 g/cm$^3$, a wear-resistant heat-resistant flexible sheet having a Young's modulus of not less than 50 kg/mm$^2$ provided on one side of the cushioning sheet, and a wear-resistant flexible sheet having a Young's modulus of not less than 50 kg/mm$^2$ provided on the other side of the cushioning sheet, the outer most layer provided on said the other side having heat sealability, and the packaging material having complete light-shielding ability as a whole.

2. The above packaging material 1 wherein the cushioning sheet is a foamed polyolefin resin sheet having a thickness of 0.3 to 3 mm and an expansion ratio of 5 to 50 times, the wear-resistant flexible sheet is a metallized flexible sheet having a higher heat resistance than the wear-resistant flexible sheet, and the wear-resistant flexible sheet has heat sealability.

3. The above packaging material 1 which is provided with light-shielding layers on both sides of the cushioning sheet.

4. A light-shielding bag for photographic photosensitive materials made by fusing to join the layers having heat sealability in the above packaging material 1,2 or 3.

5. The above packaging material 1, 2 or 3 wherein the wear-resistant flexible sheet has heat sealability and contains silicone oil, and a light-shielding bag using it.

6. The light-shielding bag 4 or 5 wherein at least one layer contains a biodegradable plastic produced by chemical synthesis which can be decomposed to carbon dioxide and water by the action of microorganisms in an amount of not less than 50 wt. %.

7. A light-shielding bag for photographic photosensitive materials made of a packaging material for photographic photosensitive materials consisting essentially of a wear-resistant heat-resistant flexible sheet having a Young's modulus of not less than 50 kg/mm$^2$, a metal membrane layer, a cushioning sheet having a density of less than 0.5 g/cm$^3$ and a wear-resistant flexible sheet having light-shielding ability and heat sealability laminated in this order from the outside each through or without an adhesive layer.

8. The packaging material 1 wherein the wear-resistant heat-resistant flexible sheet is an aluminum vacuum metallized thermoplastic resin film having an oxygen permeability of less than 50 cc/m$^2$.24 hr.1 atm.20° C. and a moisture permeability of less than 5 g/m$^2$.24 hr consisting of a uniaxially or biaxially molecular oriented thermoplastic resin film having a thickness of 5 to 100 μm and a Young's modulus in the longitudinal direction of not less than 50 kg/mm$^2$ on which an aluminum vacuum deposited membrane has been formed in a thickness of 80 to 800 Å, and the wear-resistant flexible sheet comprises a polyolefin resin film 15 to 200 μm in thickness containing 0.1 to 30 wt. % of light-shielding material.

9. The packaging material 1 wherein the wear-resistant flexible sheet has heat sealability and contains light-shielding material, and the delamination resistance of one of layer combinations has been adjusted to 0.1 to 300 g/30 mm width.

10. The packaging material 1–3, 5, 8–9 and light-shielding bag using it wherein the wear-resistant flexible sheet is one of a coextruded multilayer film.

11. The packaging material 1–3, 5, 8–9 and light-shielding bag using it wherein the wear-resistant flexible sheet are the outermost layer and the inner most layer of a laminated film wherein the inner layers of coextruded multilaeyr films are joined by blocking.

12. The packaging material 1–3, 5, 8–11 and light-shielding bag using it wherein the cushioning sheet is a foamed polyolefin resin sheet foamed by a decomposable foaming agent having a decomposition temperature of 80° to 300° C. at an expansion ratio of not less than 5 times.

13. The packaging material 1–3, 5, 8–12 and light-shielding bag using it wherein the cushioning sheet is a foamed polyolefin resin sheet which has been crosslinked and has an expansion ratio of not less than 10 times.

14. The packaging material 1–3, 5, 8–3 and light-shielding bag using it which is provided with a thermoplastic resin layer having a Young's modulus of not less than 50 kg/mm$^2$ and heat sealability on the outermost layer of the wear-resistant flexible sheet.

5. The packaging material 1–3, 5, 8–14 and light-shielding bag using it wherein the cushioning sheet has a thickness of 50 μm to 5 mm, the wear-resistant heat-resistant flexible sheet has a thickness of 7 to 200 μm, the wear-resistant flexible sheet is a coextruded multilayer film 20 to 200 μm in thickness comprising a thermoplastic resin layer having a thickness of 5 to 180 μm and a Young's modulus of not less than 50 kg/mm$^2$ and an ethylene-α-olefin copolymer resin layer containing not less than 50 wt. % of ethylene-α-olefin copolymer resin, and each layer is laminated through an adhesive layer.

16. The packaging material 1–3, 5, 8–15 and light-shielding bag using it wherein the wear-resistant heat-resistant flexible sheet is a uniaxially or biaxially molecular oriented thermoplastic resin film.

17. The packaging material 1–3, 5, 8–16 wherein the wear-resistant flexible sheet has heat sealability, and both of the wear-resistant heat-resistant flexible sheet and the wear-resistant flexible sheet are laminated onto both sides of the cushioning sheet through an extrusion laminating polyolefin resin adhesive layer 7 to 50 μm in thickness. 18. The packaging material 1–3, 5, 8–17 wherein at least one layer contains 0.1 to 20 wt. % of a light-shielding material having a refractive index of not less than 1.50.

19. The packaging material 1–3, 5, 8–18 and light-shielding bag using it wherein light-shielding ability not to induce fogging on photographic photosensitive material is imparted only by the wear-resistant flexible sheet.

20. The light-shielding bag 4 wherein the cushioning sheet has a density of 0.01 to 0.2 g/cm$^3$, the wear-resistant heat-resistant flexible sheet is an aluminum vacuum metallized biaxially stretched thermoplastic resin film having a thickness of 5 to 50 μm and a thickness of the aluminum membrane of 80 to 800 Å, the wear-resistant flexible sheet has a thickness of 10 to 200 μm and contains 0.1 to 20 wt. % of a light-shielding material having a refractive index of not less than 1.50 and a specific gravity of not less than 1.50, and the innermost layer has heat sealability.

21. The packaging material 1 wherein the wear-resistant heat-resistant flexible sheet is a metallized flexible sheet having an oxygen permeability of not more than 50 cc/m$^2$.24 hr 1 atm and a moisture permeability of not more than 5 g/m$^2$.24 hr laminated to the cushioning sheet through an adhesive layer, the wear-resistant flexible sheet is a thermoplastic resin film containing 0.1 to 30 wt. % of light-shielding material and either or both of lubricant and antistatic agent in an amount of 0.01 to 10 wt. % laminated to the cushioning sheet through an adhesive layer, the innermost layer on the wear-resistant flexible sheet side has heat sealability, and the packaging material has an optical density of not less than 7 as a whole.

22. The packaging material 1–3, 5, 8–21 and light-shielding bag using it wherein the outermost layer having heat sealability on the wear-resistant flexible sheet side contains at least not less than 50 wt. % in the total amount of either or both of homopolyethylene having a density of 0.940 to 0.985 g/cm$^3$ and a melt flow rate of 0.01 to 2 g/10 minutes and ethylene-α-olefin copolymer resin, 0.01 to 30 wt. % of light-shielding material, and either or both of lubricant and antistatic agent in an amount of 0.01 to 10 wt. %.

23. The packaging material 1–3, 5, 8–22 and light-shielding bag using it wherein the wear-resistant flexible sheet is a layer of a coextruded multilayer light-shielding film comprising the wear-resistant flexible sheet containing at least not less than 50 wt. % in the total amount of either or both of homopolyethylene having a density of 0.940 to 0.985 g/cm$^3$ and a melt flow rate of 0.0 to 2 g/10 minutes and ethylene-α-olefin copolymer resin and having heat sealability disposed as the outermost layer on wear-resistant flexible sheet side and a pinhole-resistant layer containing not less than 50 wt. % in the total amount of either or both of ethylene-α-olefin copolymer resin having a density of 0.870 to 0.935 g/cm$^3$ and a melt flow rate of 0.1 to 10 g/10 minutes and polyolefin resin elastomer and containing light-shielding material in an amount of 0.1 to 30 wt. % at least in one layer of the coextruded multilayer light-shielding film.

24. The packaging material 1–3, 5, 8–23 and light-shielding bag using it wherein the thickness of the wear-resistant flexible sheet composing the coextruded multilayer light-shielding film is 5 to 180 μm and 30 to 90% of the total thickness of the coextruded multilayer light-shielding film.

25. The packaging material 1–3, 5, 8–24 and light-shielding bag using it wherein the wear-resistant heat-resistant flexible sheet is laminated through an adhesive layer having a delamination resistance of 0.1 to 300 g/30 mm width, and the wear-resistant flexible sheet laminated through an adhesive layer having a delamination resistance of not less than 6 g/30 mm width and not less than 5 times that of the wear-resistant heat-resistant flexible sheet and the outermost layer on the wear-resistant flexible sheet side has heat sealability.

26. The packaging material 1–3, 5, 8–25 and light-shielding bag using it wherein the cushioning sheet is formed of a crosslinked polyolefin resin containing 0.1 to 5 wt. % of decomposable foaming agent having a decomposition temperature of 80° to 300° C., and has an expansion ratio of 5 to 50 times and a thickness of 0.3 to 3 mm.

27. The packaging material 1–3, 5, 8–26 and light-shielding bag using it wherein the wear-resistant flexible sheet is a layer of a coextruded multilayer light-shielding film comprising the wear-resistant flexible sheet and a light-shielding thermoplastic resin layer and the outermost layer of the coextruded multilayer light-shielding film has heat sealability.

28. The packaging material 1–3, 5, 8–27 and light-shielding bag using it wherein the delamination resistance of the cushioning sheet is no more than 300 g/30 mm width.

29. The packaging 1–3, 8, 8–28 and light-shielding bag using it wherein a light-shielding thermoplastic resin layer is provided between the cushioning sheet and the wear-resistant heat-resistant flexible sheet and between the cushioning sheet and the wear-resistant flexible sheet.

30. The packaging material 1–3, 5, 8–29 and light-shielding bag using it wherein the decomposable foaming agent has a decomposition temperature of 50° to 320° C., preferably 80° to 300° C., more preferably 90° to 290° C., and most preferably 100° to 280° C., and a gas evolution amount of not less than 100 cc/g, preferably not less than 135 cc/g, more preferably not less than 170 cc/g, and most preferably not less than 190 cc/g.

31. The packaging material 1–3, 5, 8–29 and light-shielding bag using it wherein at least one of the delamination resistance between the wear-resistant heat-resistant flexible sheet and the cushioning sheet and between the wear-resistant flexible sheet and between the wear-resistant flexible sheet and the cushioning sheet has a delamination resistance of 0.01 to 450 g/30 mm width, preferably 0.1 to 300 g/30 mm width, particularly preferably 0.5 to 200 g/30 mm width.

32. The packaging material 1–3, 5, 8–29 and light-shielding bag using it wherein the delamination resistance between the cushioning sheet and the wear-resistant flexible sheet laminated through an adhesive layer is not less than 6 g/30 mm width, preferably not less than 25 g/30 mm width, more preferably not less than 50 g/30 mm width, and most preferably not less than 100 g/30 mm width, and not less than 5 times, preferably not less than 10 times, more preferably not less than 15 times, and most preferably not less than 20 times, that between the cushioning sheet and the wear-resistant heat-resistant flexible sheet.

33. The packaging material 1–3, 5, 8–29 and light-shielding bag using it wherein the cushioning sheet has a density of not more than 0.5 g/cm³, preferably not more than 0.2 g/cm³, more preferably not more than 0.1 g/cm³, and most preferably not more than 0.05 g/cm³, the wear-resistant heat-resistant flexible sheet is disposed as the outer most layer and has a melting point of not less than 120° C., preferably not less than 150° C., more preferably not less than 180° C., and most preferably not less than 200° C., or a Vicat softening point of no less than 110° C., preferably not less than 140° C., more preferably not less than 170° C., and most preferably not less than 190° C. or not melted nor softened, and the wear-resistant flexible sheet has a melting point or a softening point lower than the wear-resistant heat-resistant flexible sheet by not less than 10° C., preferably not less than 20° C., more preferably not less than 40° C., and most preferably not less than 80° C.

34. The packaging material 1–3, 5, 8–29 and light-shielding bag using it wherein the obverse side and the reverse side of the packaging material can be discriminated even under the safety light. For example, one of the obverse side and the reverse side is formed of a light-reflective flexible sheet colored, printed or coated into white, silver, yellow, gray or the like, and the ocher side is formed of a light-absorptive flexible sheet colored, printed or coated into a color similar to the safety light or difficult to find, such as black, red, blue or brown.

35. The packaging material 1–3, 5, 8–29 and light-shielding bag using it wherein the smallest delamination resistance in the laminate of the packaging material is the delamination resistance of the cushioning sheet.

36. The packaging material 1–3, 5, 8–29 and light-shielding bag using it wherein the wear-resistant heat-resistant flexible sheet is light-reflective and the wear-resistant flexible sheet is light-absorptive.

37. The light-shielding bag 4–7, 10–16, 19, 20, 22–29 which is two-sided fin seal flat bag, three-sided fin seal flat bag or gusset bag.

Actual embodiments of the packaging material of the invention are illustrated in FIGS. 1 through 6.

The packaging material of FIG. 1 consists of a foamed sheet of the cushioning sheet 1, the wear-resistant flexible sheet 3a having a Young's modulus of not less than 50 kg/mm² and heat sealability laminated onto one side of the cushioning sheet 1 through an adhesive layer 2, and a metallized flexible sheet 6 consisting of the wear-resistant heat-resistant flexible sheet 4 having a Young's modulus of not less than 50 kg/mm² on which one face a metal membrane layer 5 is deposited and laminated onto the other side of the cushioning sheet 1 through an adhesive layer 2.

The packaging material of FIG. 2 is the same as the packaging material of FIG. 1, except that the wear-resistant flexible sheet 3a single layer is replaced by a coextruded multilayer film 8a consisting of the wear-resistant flexible sheet 3a layer having a Young's modulus of not less than 50 kg/mm² and heat sealability disposed as the outermost layer and a thermoplastic resin layer 7a disposed on the inside.

Figure 3:
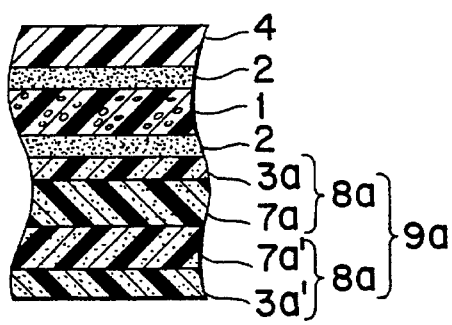

The packaging material of FIG. 3 consists of a foamed sheet of the cushioning sheet 1, a multilayer laminated film 9a formed by joining two sheets of a coextruded multilayer film 8a consisting of a layer of the wear-resistant flexible sheet 3a having a Young's modulus of not less than 50 kg/mm² and heat sealability disposed on the outside and a thermoplastic resin layer 7a disposed on the inside so as to become symmetrically laminated onto one side of the cushioning sheet 1 through an adhesive layer 2, and the wear-resistant heat-resistant flexible sheet 4 laminated onto the other side of the cushioning sheet 1 through an adhesive layer 2.

Figure 4:

The packaging maerial of FIG. 4 is a coextruded triple layer film 10a consisting of a foamed sheet of the cushioning sheet 1, a layer of the wear-resistant flexible sheet 3a having a Young's modulus of not less than 50 kg/mm² and heat sealability disposed on one side of the cushioning sheet 1 and a layer of the wear-resistant heat-resistant flexible sheet 4 having a Young's modulus of not less than 50 kg/mm² disposed on the other side of the cushioning sheet 1.

Figure 5:
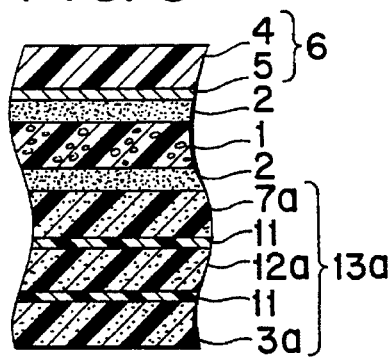

The packaging material of FIG. 5 is the same as the packaging material of FIG. 1, except that the wear-resistant flexible sheet 3a single layer is replaced by a coextruded quintuple layer film 13a consisting of a layer of the wear-resistant flexible sheet 3a having a Young's modulus of not less than 50 kg/mm² and heat sealability, a modified resin layer 11, an intermediate layer 12, a modified resin layer 11 and a thermoplastic resin layer 7a in the order from the outside.

Figure 6:
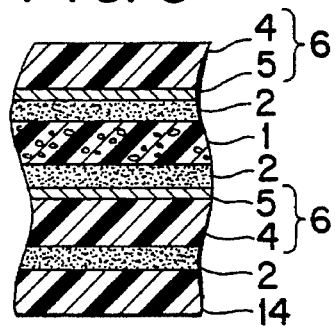

The packaging material of FIG. 6 consists of a foamed sheet of the cushioning sheet 1, a metallized flexible sheet 6 and a heat sealing layer 4 laminated onto one side of the cushioning sheet 1 each through an adhesive layer 2 and a metallized flexible sheet 6 laminated onto the other side of the cushioning sheet 1 through an adhesive layer 2.

Figure 7:
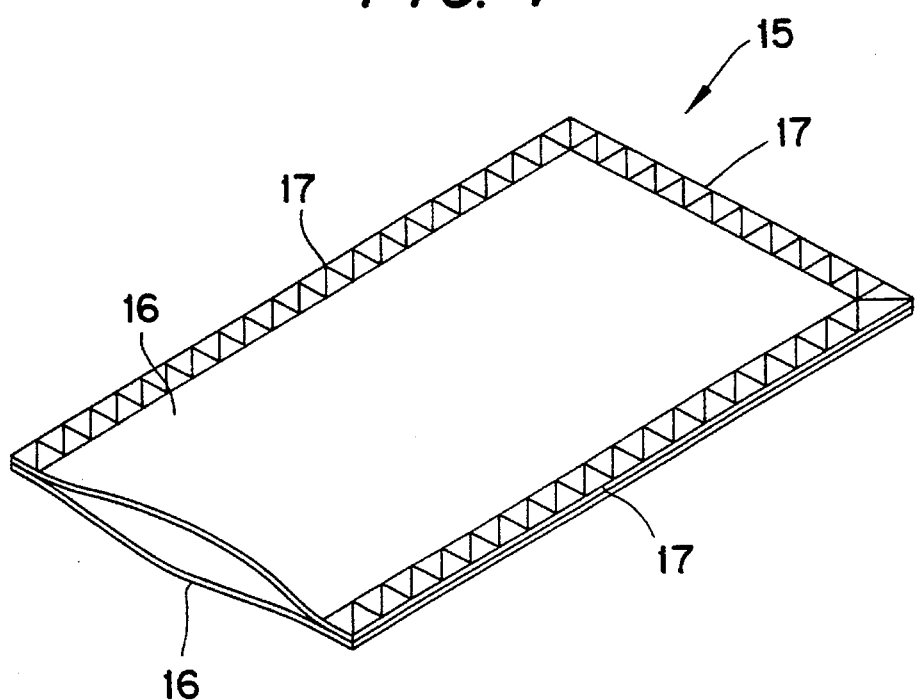
FIGS. 7 and 8 are a perspective view of a light-shielding bag for photographic photosensitive materials embodying the invention.
Figure 8:
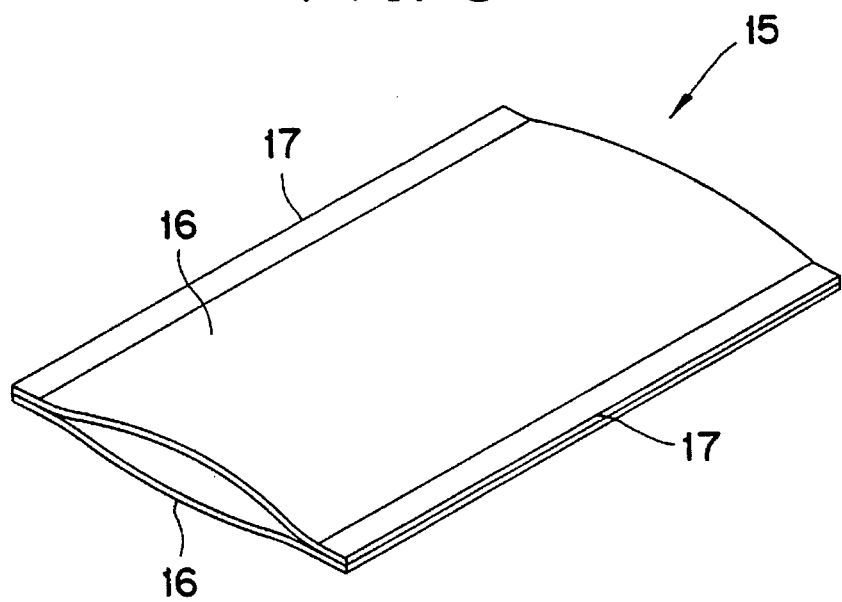

Actual embodiments of the light-shielding bag of he invention are illustrated in FIGS. 7 and 8.

The light-shielding bag 15 of FIG. 7 is a three-sided fin seal flat bag, made by superimposing two sheets of the packaging material 16,16 for photographic photosensitive materials of the invention so that the wear-resistant flexible sheet sides are faced, and joining three sides to form heat-sealed portions 17.

The light-shielding bag 15 of FIG. 8 is a two-sided fin seal flat bag, made by folding one sheet of the packaging material 16 for photographic photosensitive materials of the invention so that the wear-resistant flexible sheet sides are faced, and joining two parallel sides to form heat-sealed portions 17. The heat sealing was formed in longitudinal streaks.

Figure 9:
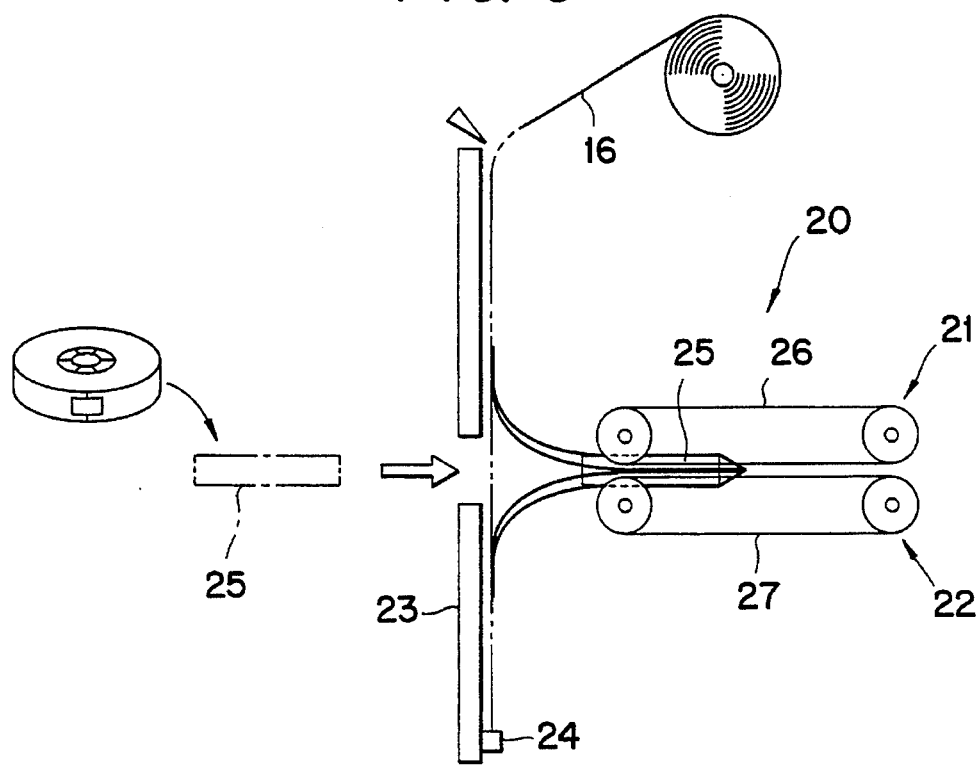
FIGS. 9 and 10 are schematic views illustrating an heat sealing apparatus used for automatic bag-making.
Figure 10:
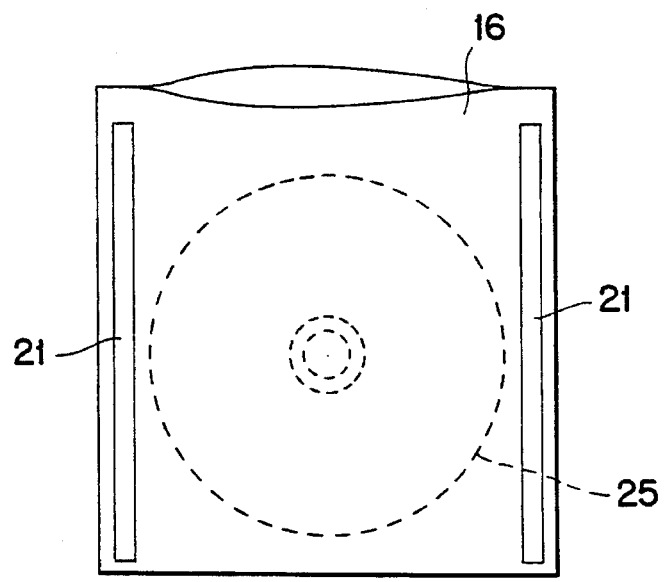

A heat sealing apparatus for automatic bag-making is illustrated in FIGS. 9 and 10. The heat sealing apparatus comprises two pairs of belt heat sealers 21,22 and a guide plate 23. A sensor 24 is provided near the lower end of the guide plate 23 for detecting the conveyed end of the packaging material 16. When the conveyed end of the packaging material 16 reaches the position of the sensor 24, conveying of the packaging material 16 is stopped, and the packaging material is cut at a prescribed length. Then, a roll of photographic film 25 is thrust horizontally. By the thrust, the packaging material is folded with backing the conveyed end and advances between the pairs of heat sealers 21,22 positioned on both sides of the packaging material 16. The heating belt 26,27 travels so as to assist the advance of the packaging material 16, and heat-seals both sides of the folded packaging material 16 containing the roll of photographic film 25. The packaging material 16 passes the belt heat sealers 21,22 as it is, and is discharged therefrom to complete bag-making and insertion of the roll of photographic film.

Figure 11:
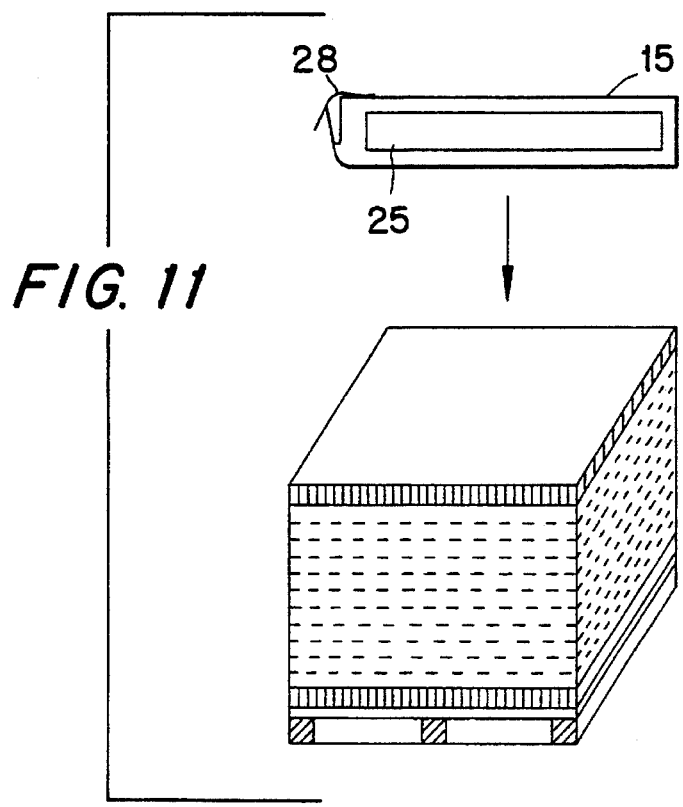
FIG. 11 illustrates a shipping state of rolls of a photographic film packaged by using the light-shielding bag of the invention.

A shipping state of the rolls of photographic film is illustrated in FIG. 11. The photographic film has a length of 6,000 feet and a width of 35 mm. The open end of the bag 15 thus formed is wound or folded several times and fixed by an adhesive tape 28 for sealing. Twenty rolls of photographic film packed as above are stacked and placed in a corrugated board box, and transported in this state.

Figure 12:
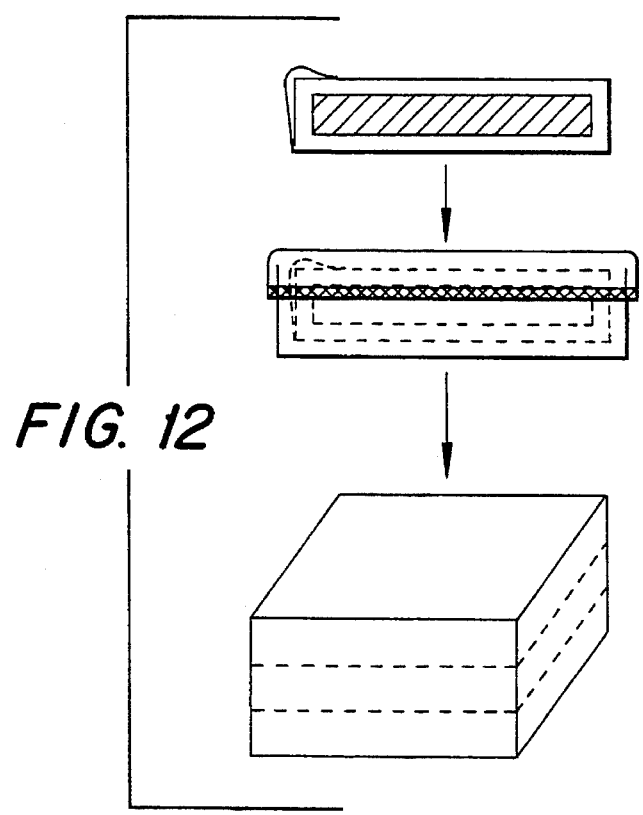
FIG. 12 illustrates a conventional shipping state of the rolls of the photographic film.

A conventional shipping state is illustrated in FIG. 12. Each roll is packaged in a light-shielding packaging bag having a five layer construction, the open end is wound and fixed by an adhesive tape for sealing. The roll packaged in the bag is further put in a metal can, and three rolls put in the can are placed in a corrugated board box, and transported in this state.

EXAMPLES

Example I

Figure 2A:
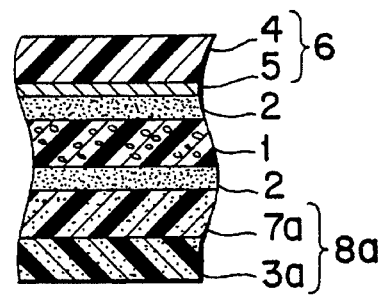

The packaging material of this example has a layer construction of FIG. 2a.

The cushioning sheet 1 was a crosslinked low density homopolyethylene resin foamed sheet of closed cell type having a thickness of 1.0 mm, an expansion ratio of 30 times and a degree of crosslinking of 45%.

The wear-resistant flexible sheet 3a was a light-shielding polyolefin resin layer composed of 86.9 wt. % of low pressure homopolyethylene resin having a MFR of 0.8 g/10 minutes, a density of 0.955 g/cm$^3$, a crystallinity of 93%, a melting point of 132° C. and a Vicat softening point of 125° C., 5 wt. % of ethylene-ethyl acrylate copolymer resin having a MFR of 7 g/10 minutes, a density of 0.930 g/cm$^3$, a Vicat softening point of 58° C. and an ethyl acrylate comonomer content of 20 wt. %, 3 wt. % of calcium stearate, 0.05 wt. % of tetrakis[methylene-(3.5-di-tert-butyl-4-hydroxyphenyl)propionate]methane, 0.05 wt. % of 2.6-di-tert-butyl-para-cresol, and 5 wt. % of furnace carbon black having a pH of 7.0, volatile components content of 0.6 wt. % including 0.05 wt. % of free sulfur, an oil absorption value of 105 ml/100 g and a mean particle size of 25 mu, having a Young's modulus of 52 kg/mm$^2$, a thickness of 25 um and heat sealability.

The light-shielding thermoplastic resin layer 7a of the coextruded double layer film 8a was a light-shielding ethylene copolymer resin layer composed of 84.7 wt. % of ethylene-butene-1 copolymer resin produced by the low pressure solution polymerization process having a MFR of 2.0 g/10 minutes, a density of 0.905 g/cm$^3$, a crystallinity of 43%, a Vicat softening point of 72° C. and a butene-1 comonomer content of 15 wt. %, 0.1 wt. % of tocopherol, 0.05 wt. % of tetrakis[methylene-3(3.5-di-tert-butyl-4-hydroxyphenyl)propionate]methane, 2 wt. % of magnesium stearate, 0.05 wt. % of erucic amide, 0.2 wt. % of synthetic silica, 8 wt. % of the same ethylene-ethyl acrylate copolymer resin and 5 wt. % of furnace carbon black as used in the wear-resistant flexible sheet 3a, having a Young's modulus of 27 kg/mm$^2$ and a thickness of 25 μm.

In the above coextruded double layer light-shielding film 8a, the resin composition of the wear-resistant flexible sheet 3a was melted at a resin temperature of 200° C. and kneaded by an extruder, and the resin composition of the light-shielding thermoplastic resin layer 7a was melted at a resin temperature of 180° C. and kneaded by another extruder. Both molten resin compositions were introduced into a circular die laminating die type, and coextruded by the inflation process at a blow-up ratio of 1.3 in the total thickness of 50 μm.

The metallized flexible sheet 6 was an aluminum vacuum deposited biaxially stretched nylon resin film composed of the flexible sheet 4 of a biaxially stretched nylon 6 resin film having a thickness of 15 μm, a Young's modulus of 175 kg/mm$^2$, a melting point of 169° C. and a Vicat softening point of 150° C. and the metal membrane layer 5 of an aluminum vacuum deposited membrane 400 Å in thickness.

Adhesive layers 2 were composed of a homopolyethylene resin composition consisting of 97.92 wt. % of high pressure homopolyethylene having a MFR of 5.6 g/10 minutes and a density of 0.920 g/cm$^3$, 2 wt. % of magnesium stearate and 0.08 wt. % of 2.6-di-tert-butyl-para-cresol (BHT), and formed by extrusion laminating at a resin temperature of 310° C. with an air gap of 110 mm in a thickness of 17 μm.

The packaging material for photographic photosensitive materials was slit into halves having a width of 600 mm, and wound into two rolls. The packaging materials were delivered from the rolls and superimposed so that respective wear-resistant flexible sheets 3a were facing each other, and both sides were heat-sealed by pairs of belt heat sealers in a width of 11.5 mm. Then, a roll of a positive photographic film for movies 35 mm width×3,000 feet length was inserted while the bottom was heat-sealed by a bar sealer into a width of 35 mm to form a three-sided fin seal flat bag having an inner size of 580 mm in length and 480 mm in width. The opening part was folded twice each in a width of 15 mm and sealed by a cellophane adhesive tape 2 cm in width. The packaged roll film was put in an octagonal corrugated board box with a lid to complete a package.

The packaging material of this example was excellent in resistance to pinholes, wear resistance, impact puncture strength, tear strength and the like compared with Comparative Example I, was excellent in rare occurrence of fogging, lumps, eye mucus and die lip streaks, and was excellent in surface smoothness.

Example II

The packaging material of this example has a layer construction of FIG. 2a and a width of 1,200 mm.

The metallized flexible sheet 6 was an aluminum vacuum deposited spunbonded nonwoven fabric composed of the flexible sheet 4 of a spunbonded polyolefin resin nonwoven fabric ("TYVEK 1444A", Dupont USA) having a thickness of 70 μm and a Young's modulus of 138 kg/mm$^2$ and the metal membrane layer 5 of an aluminum vacuum deposited membrane 500 Å A in thickness. The other construction and the bag-making method were the same as Example I.

The packaging material of this example was excellent in resistance to pinholes, wear resistance, impact puncture strength, tear strength and the like compared with Comparative Example I.

Example III

The packaging material of this example has a layer construction of FIG. 3 and a width of 1,200 mm.

The cushioning sheet 1 was a crosslinked low density homopolyethylene resin foamed sheet of closed cell type having a thickness of 1.0 mm, an expansion ratio of 30 times and a degree of crosslinking of 60%.

The flexible sheet 4 was a spunbonded polyolefin resin nonwoven fabric ("TYVEK 1444A", Dupont USA) having a thickness of 80 μm and a Young's modulus of 138 kg/mm$^2$.

The wear-resistant flexible sheet 3a of the coextruded multilayer film 8a was a light-shielding polyolefin resin layer composed of 20 wt. % of low pressure ethylene-hexene-1 copolymer resin having a MFR of 2.1 g/10 minutes, a density of 0.930 g/cm$^3$, a crystallinity of 68% and a Vicat softening point of 125° C., 69.35 wt % of low pressure ethylene-4-methylpentene-1 copolymer resin having a MFR of 0.7 g/10 minutes, a density of 0.945 g/cm$^3$, a crystallinity of 67% and a Vicat softening point of 102° C., 5 wt. % of ethylene-ethyl acrylate copolymer resin having a MFR of 5.0 g/10 minutes, a density of 0.932 g/cm$^3$, a Vicat softening point of 62° C. and an ethyl acrylate comonomer content of 16 wt. %, 0.5 wt. % of zinc stearate, 0.05 wt. % of tetrakis[methylene-3(3'.5'-di-tert-butyl-4'-hydroxyphenyl)propionate]methane as antioxidant, 0.10 wt. % of vitamin E and 3 wt. % of aluminum powder having volatile components of less than 0.5 wt. % of which the surface had been coated with stearic acid and 2 wt. % of titanium dioxide of which the surface had been coated with divalent alcohol as light-shielding material, having a thickness of 25 μm and a Young's modulus of 62 kg/mm$^2$. The thermoplastic resin layer 7a was composed 60 wt. % of low pressure ethylene-butene-1 copolymer resin having a MFR of 1.0 g/10 minutes, a density of 0.905 g/cm$^3$, a crystallinity of 38% and a Vicat softening point of 83° C., 21.9 wt. % of low pressure ethylene-octene-1 copolymer resin having a MFR of 2.0 g/10 minutes, a density of 0.920 g/cm$^3$, a crystallinity of 58% and a Vicat softening point of 106° C., 3 wt. % of the same furnace carbon black as Example I, 5 wt. % of ethylene-vinyl acetate copolymer resin havig a MFR of 6 g/10 minutes, a density of 0.930 g/cm$^3$, a Vicat softening point of 78° C. and a comonomer content of 15 wt. %, and 0.1 wt. % of 2.6-di-tert-butyl-para-cresol, and had a thickness of 20 μm. Two sheets of the above coextruded multilayer film 8a were joined by blocking at a delamination resistance of 5 g/15 mm width by pressing squeeze rolls.

Adhesive layers 2 were composed of a polyethylene resin composition consisting of 60 wt. % of high pressure homopolyethylene resin having a MFR of 2.4 g/10 minutes and a density of 0.920 g/cm$^3$, 36.4 wt. % of low pressure ethylene-butene-1 copolymer resin having a MFR of 20 g/10 minutes and a density of 0.920 g/10 minutes, 5 wt. % of ethylene-ethyl acrylate copolymer resin having a MFR of 6 g/10 minutes, a density of 0.930 g/cm$^3$ and an ethyl acrylate comonomer content of 18 wt. %, 0.5 wt. % of zinc stearate, 0.1 wt. % of 2.6-di-tert-butyl-para-cresol, and 3 wt. % of furnace carbon black having a pH of 7.7, volatile components content of 0.6 wt. % including 0.08 wt. % of free sulfur, an oil absorption value of 76 ml/100 g and a mean particle size of 21 mμ, and formed by extrusion laminating at a resin temperature of 305° C. with an air gap of 110 mm in a thickness of 20 μm.

Using the above packaging material, the same package was prepared by the same method as Example I.

The packaging material of this example was excellent in resistance to pinholes, wear-resistance impact puncture strength, tear strength and the like compared with Comparative Example I.

Example IV

The packaging material of this example has a layer construction of FIG. 1 and a width of 1,200 mm. This packaging material was the same as Example I, except that the following wear-resistant flexible sheet 3a was used instead of the coextruded double layer film 8a.

The wear-resistant flexible sheet 3a was a light-shielding ethylene copolymer resin layer composed of 84.7 wt. % of ethylene-butene-1 copolymer resin produced by the low pressure solution polymerization process having a MFR of 2.0 g/10 minutes, a density of 0.905 g/cm$^3$, a crystallinity of 43%, a Vicat softening point of 72° C. and a butene-1 comonomer content of 15 wt. %, 0.1 wt. % of tocopherol, 0.05 wt. % of tetrakis[methylene-(3.5-di-tert-butyl-4-hydroxy-phenyl)propionate]methane, 2 wt. % of magnesium stearate, 0.05 wt. % of erucic amide, 0.2 wt. % of synthetic silica, 8 wt. % of the same ethylene-ethyl acrylate copolymer resin and 5 wt. % of furnace carbon black as used in the wear-resistant flexible sheet 3a, having a Young's modulus of 27 kg/mm$^2$ and thickness of 25 μm.

The other construction and the bag-making method were the same as Example I.

The packaging material of this example was excellent in resistance to pinholes, wear resistance, impact puncture strength, tear strength and the like compared with Comparative Example I.

Example V

The packaging material of this example has a layer construction of FIG. 7 and a width of 1,200 mm.

The cushioning sheet 1 was a crosslinked ethylene-butene-1 copolymer resin foamed sheet of closed cell type having a thickness of 0.5 mm, an expansion ratio of 20 times and a degree of crosslinking of 70%.

The heat sealing layer 14 was a light-shielding polyolefin resin layer composed of 20 wt. % of low pressure homopolyethylene resin having a MFR of 0.9 g/10 minutes, a density of 0.950 g/cm³, a crystallinity of 89% and a Vicat softening point of 123° C., 71.4 wt. % of ethylene-butene-1 copolymer resin having a MFR of 4.0 g/10 minutes, a density of 0.935 g/cm³ and a Vicat softening point of 126° C., 5 wt. % of high pressure radical polymerization low density homopolyethylene resin having a MFR of 2.5 g/10 minutes, a density of 0.920 g/cm³, a crystallinity of 62% and a Vicat softening point of 107° C., 0.5 wt. % of magnesium stearate, 0.1 wt. % of vitamin E and 3 wt. % of the same furnace carbon black as Example I, having a thickness of 100 μm and a Young's modulus of 67 kg/mm².

The metallized flexible sheet 6 and the adhesive layers 2 were the same as Example I. The bag-making method was also the same as Example I.

The packaging material of this example was excellent in resistance to pinholes, wear resistance, impact puncture strength, tear strength and the like compared with Comparative Example I.

Example VI

The packaging material of this example has a layer construction of FIG. 2 and a width of 1,400 mm.

The cushioning sheet 1 was a crosslinked low density homopolyethylene resin foamed sheet of closed cell type having a thickness of 0.5 mm, an expansion ratio of 30 times (density 0.03 g/cm³) and a degree of crosslinking of 75%.

The light-shielding thermoplastic resin layer 7a laminated between the cushioning sheet 1 and the wear-resistant heat-resistant flexible sheet 6 through adhesive layers 2,2 was a light-shielding ethylene-α-olefin copolymer resin layer composed of 96.85 wt. % of ethylene-octane-1 copolymer resin having a MFR of 2.5 g/10 minutes, a density of 0.920 g/cm³, a crystallinity of 35%, a melting point of 105° C. and a Vicat softening point of 96° C., 0.05 wt. % of erucic amide as the lubricant, 0.05 wt. % of "Irganox 1010" and 0.05 wt. % of "Irganox 1076" as the antioxidant, and 3 wt. % of the same furnace carbon black as Example I, having a thickness of 35 μm and a Young's modulus of 35 kg/mm².

The wear-resistant flexible sheet 3a was a light-shielding high density homopolyethylene resin layer composed of 91.7 wt. % of high density homopolyethylene resin having a MFR of 0.4 g/10 minutes, a density of 0.960 g/cm³, a crystallinity of 95%, a melting point of 138° C. and a Vicat softening point of 130° C., 5 wt. % of low density homopolyethylene resin haing a MFR of 2.4 g/10 minutes, a density of 0.925 g/cm³, a crystallinity of 62%, a melting point of 101° C. and a Vicat softening point of 92° C., 0.05 wt. % of erucic amide as the lubricant, 0.05 wt. % of tetrakis [methylene-3(3.5-di-tert-butyl-4-hydroxyphenyl)propionate]methane, 0.2 wt. % of 1.3,2.4-di-p-methylbenzylidene sorbitol as the organic nucleating agent and 3 wt. % of furnace carbon black having a pH of 7.0, volatile components content of 0.5 wt. %, an oil absorption value of 93 ml/100 g and a mean particle size of 21 mμ as the light-shielding material, having a Young's modulus of 61 kg/mm², a thickness of 30 μm and heat sealability.

The light-shielding thermoplastic resin layer 7a of the coextruded double layer inflation film 8a was a light-shielding ethylene-α-olefin copolymer resin layer composed of 91.65 wt. % of ethylene-4-methylpentene-1 copolymer resin having a MFR of 2.0 g/10 minutes, a density of 0.920 g/cm³, a crystallinity of 45% and a Vicat softening point of 98° C., 0.05 wt. % of tocopherol and 0.05 wt. % of tetrakis[methylene-3(3.5-di-tert-butyl-4-hydroxyphenyl-)propionate]methane as the antioxidant, 0.2 wt. % of zinc stearate and 0.05 wt. % of erucic amide as the lubricant, 5 wt. % of the same low density homopolyethylene resin and 3 wt. % of furnace carbon black as used in the wear-resistant flexible sheet 3a, having Young's modulus of 38 kg/mm² and a thickness of 25 μm.

In the above coextruded double layer light-shielding film 8a, the resin composition of the wear-resistant flexible sheet 3a was melted at a resin temperature of 205° C. and kneaded by an extruder and the resin composition of the light-shielding thermoplastic resin layer 7a was melted at a resin temperature of 190° C. and kneaded by another extruder. Both molten resin compositions were introduced into a circular die laminating in die type and coextruded by the inflation process at a blow-up ratio of 1.2 in the total thickness of 55 μm.

The metallized flexible sheet 6 was an aluminum vacuum deposited biaxially stretched polyester resin film composed of the wear-resistant heat-resistant flexible sheet 4 of a polyethylene terephthalate resin film having a thickness of 12 μm, a Young's modulus of 215 kg/mm² and a melting point of 260° C. and the metal membrane layer 5 of an aluminum vacuum deposited membrane 350 Å in thickness.

Two adhesive layers 2 joining the metal membrane layer 5 and the light-shielding thermoplastic resin layer 7a and the cushioning sheet 1 was composed of a light-shielding low density homopolyethylene resin composition consisting of 99.95 wt. % of low density homopolyethylene having a MFR of 5.6 g/10 minutes and a density of 0.920 g/cm³ and 0.05 wt. % of 2.6-di-tert-butyl-para-cresol, and formed by extrusion laminating at a resin temperature of 315° C. with an air gap of 110 mm in a thickness of 15 μm.

The adhesive layer 2 joining the light-shielding coextruded double layer film 8a to the cushioning sheet was composed of a low density homopolyethylene resin composition consisting of 99.95 wt. % of low density homopolyethylene having a MFR of 5.6 g/10 minutes and a density of 0.920 g/cm³ and 0.05 wt. % of 2 6-di-tert-butyl-para-cresol, and formed by extrusion laminating at a resin temperature of 310° C. with an air gap of 110 mm in a thickness of 15 μm.

The packaging material for photographic photosensitive materials was slit into halves having a width of 700 mm, and wound into two rolls.

Packages of roll films 6,000 feet in length 35 mm in width for movie were prepared using the above packaging material according to the method shown in FIGS. 9 and 10. The width of the heat-sealed portions on both sides of the two-sided fin seal flat bag formed was 15 mm respectively, and the inner size was 70 mm in length and 670 mm in width. The opening part was folded and sealed by a cellophane adhesive tape. Twenty roll films packaged above were stacked on a box bin on a pallet, and fixed to the pallet by a plastic band to make an assembly package.

The packaging material of this example was excellent in resistance to pinholes, wear resistance, heat resistance, impact puncture strength, tear strength and the like compared with Comparative Example I, was excellent in rare occurrence of fogging, lumps, eye mucus and die lip streaks, and was excellent in bag-making ability, surface smoothness, slipping character between photographic photosensitive materials, and antistatic properties. Since the packaging material was excellent in small curling and heat sealing properties, it had a high speed automatic bag-making ability, and the packaging cost could be decreased to less than a half of the conventional impulse sealing type packaging bag.

Using the above packaging material, roll films 2,000 feet in length 35 mm in width and roll film 4,000 feet in length 35 mm were also packaged. The inner size of the two-sided fin seal flat bag used for the roll of 2,000 feet was 603 mm in length 475 mm in width, and that for the roll of 4,000 feet was 600 mm in length 577 mm in width. The packaging material exhibited excellent protection of the roll films, and bag rupture troubles did not occur at all.

Example VII

The packaging material of this example has a layer construction of FIG. 2 and a width of 1,400 mm.

The cushioning sheet 1 was a crosslinked ethylene-butene-1 copolymer resin foamed sheet of closed cell type having a thickness of 0.5 mm, an expansion ratio of 30 times (density: 0.03 g/cm$^3$) and a degree of crosslinking of 80% foamed by using a decomposable foaming agent of azodicarbonamide, a decomposition temperature of 190° to 230° C. and a gas evolution volume of 190 cc/g.

The wear-resistant flexible sheet 3a was a light-shielding high density homopolyethylene resin layer composed of 86.85 wt. % of high density homopolyethylene resin having a MFR of 0.65 g/10 minutes, a density of 0.952 g/cm$^3$, a crystallinity of 92%, a melting point of 138° C. and a Vicat softening point of 126° C., 10 wt. % of ethylene-butene-1 copolymer resin having a MFR of 2.0 g/10 minutes, a density of 0.922 g/cm$^3$, a crystallinity of 36%, a melting point of 116° C., and a Vicat softening point of 105° C., 0.05 wt. % of erucic amide as the lubricant 0.05 wt. % of hindered phenolic antioxidant of tetrakis[methylene-(3.5-di-tert-butyl-4-hydroxyphenyl)propionate]methane ("Irganox 1010", molecular weight: 1177, Ciba Geigy), 0.05 wt. % of phosphorus-containing antioxidant of stearyl-β-(3,5-di-tert-butyl-4-hydroxyphenyl)propionate ("Irganox 1076", molecular weight: 530, Ciba Geigy) and 3 wt. % of furnace carbon black having a pH of 7.0, volatile components content of 0.5 wt. %, an oil absorption value of 93 ml/100 g and a mean particle size of 21 mμ, having a Young's modulus of 56 kg/mm$^2$, a thickness of 25 μm and heat sealability.

The light-shielding thermoplastic resin layer 7a of the coextruded double layer inflation film 8a was a light-shielding ethylene-α-olefin copolymer resin layer composed of 91.5 wt. % of ethylene-4-methylpentene-1 copolymer resin having a MFR of 2.0 g/10 minutes, a density of 0.920 g/cm$^3$, a crystallinity of 45% and a Vicat softening point of 98° C., 0.05 wt. % of stearyl-β-(3,5-di-tert-butyl-4-hydroxyphenyl)propionate, 0.05 wt. % of tetrakis[methylene-3(3.5-di-tert-butyl-4-hydroxy-phenyl) propionate methane, 0.2 wt. % of zinc stearate, 0.05 wt. % of erucic amide, 0.15 wt. % of polyoxyethylene glycerine fatty acid ester as the antioxidant, 5 wt. % of the same low density homopolyethylene resin and 3 wt. % of furnace carbon black as used in the wear-resistant flexible sheet 3a, having a Young's modulus of 38 kg/mm$^2$ and a thickness of 25 μm.

In the above coextruded double layer light-shielding film 8a, the resin composition of the wear-resistant flexible sheet 3a was melted at a resin temperature of 200° C. and kneaded by an extruder, and the resin composition of the light-shielding thermoplastic resin layer 7a was melted at a resin temperature of 190° C. and kneaded by another extruder. Both molten resin compositions were introduced into a circular die laminating in die type, and coextruded by the inflation process at a blow-up ratio of 1.2 the total thickness of 50 μm.

The metallized flexible sheet 6 was an aluminum vacuum deposited biaxially stretched polyamide (nylon 6) resin film composed of the wear-resistant heat-resistant flexible sheet 4 of a polyamide (nylon 6) resin film having a thickness of 15 μm, a Young's modulus of 195 kg/mm$^2$, a melting point of 218° C. and the metal membrane layer 5 of an aluminum vacuum deposited membrane 400 Å in thickness.

The adhesive layers 2 joining the metal membrane layer 5 to the cushioning sheet 1 was composed of a light-shielding low density homopolyethylene resin composition consisting of 95.95 wt. % of low density homopolyethylene having a MFR of 6.2 g/10 minutes and a density of 0.918 g/cm$^3$, 0.05 wt. % of 2.6-di-tert-butyl-para-cresol and 5 wt. % of the same furnace carbon black as the wear-resistant flexible sheet 3a, and formed by extrusion laminating at a resin temperature of 315° C. with an air gap of 110 mm in a thickness of 20 μm. The delamination resistance between the wear-resistant flexible sheet and the cushioning sheet was 12 g/30 mm width.

The adhesive layer 2 joining the coextruded double layer film 8a to the cushioning sheet 1 were composed of a low density homopolyethylene resin composition consisting of 99.95 wt. % of low density homopolyethylene having a MFR of 5.6 g/10 minutes and a density of 0.920 gcm$^3$ and 0.05 wt. % of 2 6-di-tert-butyl-para-cresol, and formed by extrusion laminating at a resin temperature of 310° C. with an air gap of 110 mm in a thickness of 15 μm. The delamination resistance between the coextruded double layer film 8a and the cushioning sheet was 556 g/30 mm width which was 46.3 times that between the wear-resistant flexible sheet and the cushioning sheet 1.

The packaging material for photographic photosensitive materials was slit into halves having a width of 700 mm, and wound into two rolls.

Packages of roll films 6,000 feet in length 35 mm in width for movies were prepared using the above packaging material according to the method shown in FIGS. 9 and 10. The width of the heat-sealed portions on both sides of the two-sided fin seal flat bag formed was 5 mm respectively, and the inner size was 740 mm in length and 670 mm in width. The opening part was folded and sealed by a cellophane adhesive tape. Twenty roll films packaged above were stacked on a box bin on a pallet, and fixed to the pallet by a plastic band to make an assembly package.

The packaging material of this example was excellent in resistance to pinholes, wear resistance, heat resistance, impact puncture strength, tear strength and the like compared with Comparative Example I, was excellent in rare occurrence of fogging, lumps, eye mucus and die lip streaks, and was excellent in bag-making ability, surface smoothness, slipping character between photographic photosensitive materials, and antistatic properties. Since the packaging material was excellent in small curling and heat sealing properties, it had a high speed automatic bag-making ability, and the packaging cost could be decreased to less than a half of the conventional impulse sealing type packaging bag.

Besides the delamination resistance between the wear-resistant head-resistant flexible sheet 4 and the cushioning sheet 1 was 12 g/30 mm width wherein the delamination occurred between the flexible sheet 4 and the metal membrane layer 5 which was less than 300 g/30 mm width, whereas the delamination resistance between the coextruded double layer film 8a and the cushioning sheet 1 was very strong 556 g/30 mm width. Accordingly, the packaging material was excellent in resistance to pinholes, complete sealability, heat sealing properties, complete light-shielding ability, impact strength and bag rupture strength, and quality troubles in photographic properties, such as fogging and static marks did not occur at all, particularly in export films.

Using the above packaging material, roll films 2,000 feet in length 35 mm in width and roll films 4,000 feet in length 35 mm were also packaged. The inner size of the two-sided fin seal flat bag used for the roll of 2,000 feet was 603 mm in length 475 mm in width, and that for the roll of 4,000 feet was 600 mm in length 577 mm in width. The packaging material exhibited excellent protection of the roll films, and bag rupture troubles did not occur at all.

Example VIII

Figure 2B:
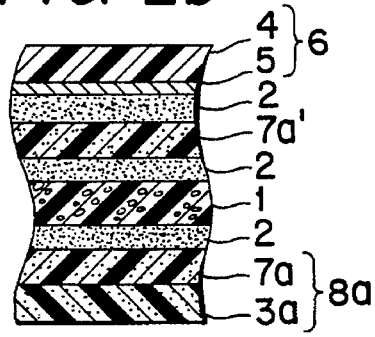

The packaging material for photographic phtosensitive materials used has a layer construction corresponding to FIG. 2b and a width of 1,400 mm. The packaging material was slit into halves having a width of 700 mm, and wound into rolls. Using the packaging material, a two-sided fin seal flat bag having the same size as Example VI was prepared and made into the same assembly package as Example VI.

The packaging material of this example has a layer construction of the metalllized flexible sheet 6 of an aluminum vacuum deposited biaxially stretched nylon resin film composed of the wear-resistant heat-resistant flexible sheet 4 of a biaxially stretched nylon resin film 15±3 μm in thickness and an aluminum vacuum deposited membrane 400±50 Å, a LDPE adhesive layer 13±2 μm in thickness 2, a light-shielding thermoplastic layer 7a 30±5 μm in thickness, a LDPE adhesive layer 13±2 μm in thickness, the cushioning sheet 1 of a foamed polyethylene sheet 0.5±0.1 mm in thickness, a LDPE adhesive layer 13±2 μm in thickness, and coextruded double layer film 8a consisting of a light-shielding thermoplastic resin layer 7a 25±5 μm in thickness and the wear-resistant flexible sheet 3a of an orientation MDPE resin layer 25±5 μm in thickness having heat sealability. The light-shielding thermoplastic resin layer 7a was composed of low density homopolyethylene resin having a MFR of 2.4 g/10 minutes, a density of 0.925 g/cm$^3$ and a crystallinity of 62% containing 3 wt. % of carbon black. The surface of the biaxially stretched nylon resin film was provided with a anchor coat layer and under coat layer to improve the delamination resistance between the aluminum vacuum deposited membrane. The other matters were the same as the packaging material of example VI except layer thickness.

A two-sided fin seal flat bag was made using the above packaging material according to the method shown in FIGS. 9 and 10 by heat sealing between the orientational HDPE resin layers, and each delamination resistance of two peelable parts, i.e. between the flexible sheet 6 and the black polyethylene film and at the cushioning sheet 1 was measured. The other parts had a delamination resistance of more than 500 g/15 mm width, i.e. 1000 g/15 mm width, and accordingly, could not be determined.

The delamination resistance was measured according to ASTM D-903. An end of the laminate was partly peeled, and the separated both ends were grasped by the chuck of a tearing tester (Stro R Tester). Then, the both ends were pulled at an angle of 180 degrees under the following conditions, and the maximum load was determined.

| Range (full-scale) | 500 g |
| Tearing speed | 300 mm/min. |
| Chart speed | 100 mm/min. |
| Distance between chucks | 150 mm |
| Sample width | 15 mm |
| Number of samples | 4 |

Results are summarized in the following table.

| Sample width | 15 mm |
| Number of samples | 4 |

Results are summarized in the following table.

|  | N = 1 | N = 2 | N = 3 | N = 4 | Maximum | Minimum | Average |
| --- | --- | --- | --- | --- | --- | --- | --- |
| Between flexible sheet and black PE film | 200 g | 180 g | 185 g | 185 g | 200 g | 185 g | 187.5 g |
| Cushioning sheet | 85 g | 85 g | 90 g | 95 g | 95 g | 85 g | 88.8 g |

The packaging material had no or small curling, and was excellent in bag-making ability, physical strength and bag rupture strength. The obverse side and the reverse side could be discriminated even under the safety light.

Comparative Example I

The packaging material of this example corresponds the laminated sheet disclosed in Japanese Utility Model KOKOKU No. 2-736, and consisted of a polyethylene resin foamed sheet having a thickness of 1 mm and an expansion ratio of 30 times and two sheets of a uniaxially stretched high density polyethylene resin film 45 μm in thickness containing 3.0 wt. % of carbon black laminated onto both sides of the foamed sheet so that the orientation axes cross each other at 90 degrees through an extrusion laminating adhesive layer 20 μm in thickness composed of low density homopolyethylene. The total thickness was about 250 μm.

It was tried to form a three-sided film seal flat bag having the same size according to the same method as Example I. However, heat sealing could not be made completely, and light entered into the bag. The part contacted with the heat sealing bar was melted to form pinholes. Moreover, physical strength sharply decreased, and bag rupture occurred frequently.

In the above examples, melt flow rate, density and Vicat softening point were measured according to ASTM D-1238, ASTM D-1505 and ASTM D-1525. Melting point was the temperature when melting was finished measured by using a differential scanning calorimeter (DSC).

We claim:

1. A packaging material for photographic photosensitive materials usable for packaging a roll or sheets of photographic film or photographic paper having a sharp edge and a weight of not less than 500 grams, said packaging material consisting essentially of a cushioning sheet having a density of less than 0.5 g/cm$^3$ wherein the cushioning sheet is a foamed crosslinked polyolefin resin sheet having a thickness of 0.3 to 3 mm and an expansion ratio of 10 to 50 times, a wear-resistant and heat-resistant flexible sheet having a Young's modulus of not less than 50 kg/mm$^2$ provided on one side of the cushioning sheet wherein the wear-resistant and heat-resistant flexible sheet is a metallized flexible sheet having a metal membrane with a thickness of 55 to 1200 angstroms, an oxygen permeability of not more than 50 cc/m$^2$.24 hr.1 atm.20° C. and a moisture permeability of not more than 5 g/m$^2$ .24 hr, and a wear-resistant flexible sheet having heat-sealability and a Young's modulus of not less than 50 kg/mm$^2$ provided on the other side of the cushioning sheet, wherein the wear-resistant heat-resistant flexible sheet has a greater heat resistance than the wear-resistant flexible sheet, and has a melting point higher than the wear-resistant flexible sheet by not less than 20° C., an outer most layer provided on said other side having heat sealability, and the packaging material having complete light-shielding ability as a whole.

2. The packaging material of claim 1 which is provided with light-shielding layers on both sides of the cushioning sheet.

3. A light-shielding bag for photographic photosensitive materials made by fusing to join the layers having heat sealability in the above packaging material of claim 1, or 2.

4. The packaging material of claim 1 or 2 wherein the wear-resistant flexible sheet contains silicone oil.

5. The light-shielding bag of claim 3 wherein the wear-resistant flexible sheet contains silicone oil.

6. The light-shielding bag of claim 3 wherein at least one layer contains a biodegradable plastic produced by chemical synthesis which can be decomposed to carbon dioxide and water by the action of microorganisms in an amount of not less than 50 wt. %.

7. A light-shielding bag for photographic photosensitive materials in the form of a roll or sheets of photographic film or photographic paper having a sharp edge and a weight of not less than 500 grams, said light-shielding bag being made of a packaging material for photographic photosensitive materials consisting essentially of a wear-resistant and heat-resistant flexible sheet having a Young's modulus of not less than 50 kg/mm$^2$ wherein the wear-resistant and heat-resistant flexible sheet is a metallized flexible sheet having a metal membrane with a thickness of 55 to 1200 angstroms, an oxygen permeabilty of not more than 50 cc/m$^2$.24 hr.1 atm.20° C. and a moisture permeability of not more than 5 g/m$^2$.24 hr, a cushioning sheet having a density of less than 0.5 g/cm$^3$ wherein the cushioning sheet is a foamed crosslinked polyolefin resin sheet having a thickness of 0.3 to 3 mm and an expansion ratio of 10 to 50 times, and a wear-resistant flexible sheet having a light-shielding ability and heat sealability laminated in this order from the outside each through or without an adhesive layer wherein the wear-resistant heat-resistant flexible sheet has a greater heat resistance than the wear-resistant flexible sheet, and has a melting point higher than the wear-resistant flexible sheet by not less than 20° C.

8. The packaging material of claim 1 wherein the wear-resistant and heat-resistant flexible sheet is an aluminum vacuum metallized thermoplastic resin film having an oxygen permeability of less than 50 cc/m$^2$.24 hr. atm. 20° C. and a moisture permeability of less than 5 g/m$^2$.24 hr consisting of a uniaxially or biaxially molecularly oriented thermoplastic resin film having a thickness of 5 to 100 µm and a Young's modulus in the longitudinal direction of not less than 50 kg/mm$^2$ on which an aluminum vacuum deposited membrane has been formed in a thickness of 80 to 800 Å, and the wear-resistant flexible sheet comprises a polyolefin resin film 15 to 200 µm in thickness containing 0.1 to 30 wt. % of light-shielding material.

9. The packaging material of claim 1 wherein the wear-resistant flexible sheet has heat sealability and contains 0.05 to 50 wt. % light-shielding material, and the delamination resistance of one of layer combinations has been adjusted to 0.1 to 300 g/30 mm width.

10. The packaging material of claim 1, 2, 8, or 9 wherein the wear-resistant flexible sheet is one of a coextruded multilayer film.

11. The packaging material of claim 1, 2, 8 or 9 wherein the wear-resistant flexible sheet are the outermost layer and the inner most layer of a laminated film wherein the innermost layer of coextruded multilayer films are joined by blocking.

12. The packaging material of claim 1, 2, 8 or 9 wherein the cushioning sheet is a foamed polyolefin resin sheet foamed by a decomposable foaming agent having a decomposition temperature of 80° to 300° C. at an expansion ratio of not less than 5 times.

13. The packaging material of claim 1, 2, 8 or 9 which is provided with a thermoplastic resin layer having a Young's modulus of not less than 50 kg/mm$^2$ and heat sealability on the outermost layer of the wear-resistant flexible sheet.

14. The packaging material of claim 1, 2, 8 or 9 wherein the cushioning sheet has a thickness of 50 µm to 5 mm, the wear-resistant and heat-resistant flexible sheet has a thickness of 7 to 200 µm, the wear-resistant flexible sheet is a coextruded multilayer film 20 to 200 µm in thickness comprising a thermoplastic resin layer having a thickness of 5 to 180 µm and a Young's modulus of not less than 50 50 kg/mm$^2$ and an ethylene-α-olefin copolymer resin layer containing not less than 50 wt. % of ethylene-α-olefin copolymer resin, and each layer is laminated through an adhesive layer.

15. The light-shielding bag of claim 3 wherein the packaging material is a packaging material having a thickness of 50 µm to 5 mm, the wear-resistant and heat-resistant flexible sheet has a thickness of 7 to 200 µm, the wear-resistant flexible sheet is coextruded multilayer film 20 to 200 µm in thickness comprising a thermoplastic resin layer having a thickness of 5 to 180 µm and a Young's modulus of not less than 50 kg/mm$^2$ and an ethylene-α-olefin copolymer resin layer containing not less than 50 wt. % of ethylene-α-olefin compolymer resin, and each layer is laminated through an adhesive layer.

16. The packaging material of claim 1, 2, 8 or 9 wherein the wear-resistant and heat-resistant flexible sheet is a uniaxially or biaxially molecularly oriented thermoplastic resin film.

17. The light-shielding bag of claim 3 wherein the wear-resistant and heat-resistant flexible sheet is a uniaxially or biaxially molecularly oriented thermoplastic resin film.

18. The packaging material of claim 1, 2, 8 or 9 wherein both of the wear-resistant and heat-resistant flexible sheet and the wear-resistant flexible sheet are laminated onto both sides of the cushioning sheet through an extrusion laminating polyolefin resin adhesive layer 7 to 50 µm in thickness.

19. The packaging material of claim 1, 2, 8 or 9 wherein at least one layer contains 0.1 to 20 wt. % of a light-shielding material having a refractive index of not less than 1.50.

20. The packaging material of claim 1, 2, 8 or 9 wherein light-shielding ability not to induce fogging of photographic photosensitive material is imparted only by the wear-resistant flexible sheet.

21. The light-shielding bag of claim 3 wherein the cushioning sheet has a density of 0.01 to 0.2 g/cm$^3$, the wear-resistant and heat-resistant flexible sheet is an aluminum vacuum metallized biaxially stretched thermoplastic resin film having a thickness of 5 to 50 µm and a thickness of the aluminum membrane of 80 to 800 Å, the wear-resistant flexible sheet has a thickness of 10 to 200 µm and contains 0.1 to 20 wt. % of a light-shielding material having a refractive index of not less than 1.50 and a specific gravity of not less than 1.50, and the innermost layer has heat sealability.

22. The packaging material of claim 1 wherein the wear-resistant and heat-resistant flexible sheet is a metallized flexible sheet having a metal membrane with a thickness of 55 to 1200 angstroms and having an oxygen permeability of not more than 55 c/m$^2$.24 hr.1 atm and a moisture permeability of not more than 5 g/m².24 hr laminated to the cushioning sheet through an adhesive layer, the wear-resistant flexible sheet is a thermoplastic resin film containing 0.1 to 30 wt. % of light-shielding material and either or both of lubricant and antistatic agent in an amount of 0.01 to 10 wt. % laminated to the cushioning sheet through an adhesive layer, the innermost layer on the wear-resistant flexible sheet side has heat sealability, and the packaging material has an optical density of not less than 7 as a whole.

23. The packaging material of claim 1, 2, 8, 9 or 22 wherein the outermost layer having heat sealability on the wear-resistant flexible sheet side contains at least not less than 50 wt. % in the total amount of either or both of homopolyethylene having a density of 0.940 to 0.985 g/cm³ and a melt flow rate of 0.01 to 2 g/10 minutes and ethylene-α-olefin copolymer resin, 0.01 to 30 wt. % of light-shielding material, and either or both of lubricant and antistatic agent in an amount of 0.01 to 10 wt. %.

24. The light-shielding bag of claim 3 wherein the outermost layer having heat sealability on the wear-resistant flexible sheet side contains at least not less than 50 wt. % in the total amount of either or both of homopolyethylene having a density of 0.940 to 0.985 g/cm³ and a melt flow rate of 0.01 to 2 g/10 minutes and ethylene-α-olefin copolymer resin, 0.01 to 30 wt. % of light-shielding material, and either or both of lubricant and antistatic agent in an amount of 0.01 to 10 wt. %.

25. The packaging material of claim 1, 2, 8, 9 or 22 wherein the wear-resistant flexible sheet is a layer of a coextruded multilayer light-shielding film comprising the wear-resistant flexible sheet containing at least not less than 50 wt. % in the total amount of either or both of homopolyethylene having a density of 0.940 to 0.985 g/cm³ and a melt flow rate of 0.01 to 2 g/10 minutes and ethylene-α-olefin copolymer resin and having heat sealability disposed as the outermost layer on the wear-resistant flexible sheet side and a pinhole-resistant layer containing not less than 50 wt. % in the total amount of either or both of ethylene-α-olefin copolymer resin having a density of 0.870 to 0.935 g/cm³ and a melt flow rate of 0.1 to 10 g/10 minutes and polyolefin resin elastomer and containing light-shielding material in an amount of 0.1 to 30 wt. % at least in one layer of the coextruded multilayer light-shielding film.

26. The light-shielding bag of claim 3 wherein the wear-resistant flexible sheet is a layer of a coextruded multilayer light-shielding film comprising the wear-resistant flexible sheet containing at least not less than 50 wt. % in the total amount of either or both of homopolyethylene having a density of 0.940 to 0.985 g/cm³ and a melt flow rate of 0.01 to 2 g/10 minutes and ethylene-α-olefin copolymer resin and having heat sealability disposed as the outermost layer on the wear-resistant flexible sheet side and a pinhole-resistant layer containing not less than 50 wt. % in the total amount of either or both of ethylene-α-olefin copolymer resin having a density of 0.870 to 0.935 g/cm³ and a melt flow rate of 0.1 to 10 g/10 minutes and polyolefin resin elastomer and containing light-shielding material in an amount of 0.1 to 30 wt. % at least in one layer of the coextruded multilayer light-shielding film.

27. The packaging material of claim 25 wherein the thickness of the wear-resistant flexible sheet composing the coextruded multilayer light-shielding film is 5 to 180 μm and 30 to 90% of the total thickness of the coextruded multilayer light-shielding film.

28. The light-shielding bag of claim 26 wherein the thickness of the wear-resistant flexible sheet composing the coextruded multilayer light-shielding film is 5 to 180 μm and 30 to 90% of the total thickness of the coextruded multilayer light-shielding film.

29. The packaging material of claim 1, 2, 8, 9 or 22 wherein the wear-resistant heat-resistant flexible sheet is laminated through an adhesive layer having a delamination resistance of 0.1 to 300 g/30 mm width, and the wear-resistant flexible sheet laminated through an adhesive layer having a delamination resistance of not less than 6 g/30 mm width and not less than 5 times that of the wear-resistant and head-resistant flexible sheet and the outermost layer on the wear-resistant flexible sheet side has heat sealability.

30. The light-shielding bag of claim 3 wherein the wear-resistant and head-resistant flexible sheet is laminated through an adhesive layer having a delamination resistance of 0.1 to 300 g/30 mm width, and the wear-resistant flexible sheet laminated through an adhesive layer having a delamination resistance of not less than 6 g/30 mm width and not less than 5 times that of the wear-resistant and heat-resistant flexible sheet and the outermost layer on the wear-resistant flexible sheet side has heat sealability.

31. The packaging material of claim 1, 2, 8, 9 or 22 wherein the cushioning sheet is formed of a crosslinked polyolefin resin containing 0.1 to 5wt. % of decomposable foaming agent having a decomposition temperature of 80° to 300° C. and has an expansion ratio of 5 to 50 times and a thickness of 0.3 to 3 mm.

32. The light-shielding bag of claim 3 wherein the cushioning sheet is formed of a crosslinked polyolefin resin containing 0.1 to 5 wt. % of decomposable foaming agent having a decomposition temperature of 80° to 300° C., and has an expansion ratio of 5 to 50 times and a thickness of 0.3 to 3 mm.

33. The packaging material of claim 1, 2, 8, 9 or 22 wherein the wear-resistant flexible sheet is a layer of a coextruded multilayer light-shielding film comprising the wear-resistant flexible sheet and a light-shielding thermoplastic resin layer and the outermost layer of the coextruded multilayer light-shielding film has heat sealability.

34. The light-shielding bag of claim 3 wherein the wear-resistant flexible sheet is a layer of a coextruded multilayer light-shielding film comprising the wear-resistant flexible sheet and a light-shielding thermoplastic resin layer and the outermost layer of the coextruded multilayer light-shielding film has heat sealability.

35. The packaging material of claim 1, 2, 8, 9 or 22 wherein the delamination resistance of the cushioning sheet is not more than 400 g/30 mm width.

36. The light-shielding bag of claim 3 wherein the delamination resistance of the cushioning sheet is not more than 400 g/30 mm width.

37. The packaging material of claim 1, 2, 8, 9 or 22 wherein a light-shielding thermoplastic resin layer is provided between the cushioning sheet and the wear-resistant and heat-resistant flexible sheet and between the cushioning sheet and the wear-resistant flexible sheet.

38. The light-shielding bag of claim 3 wherein a light-shielding thermoplastic resin layer is provided between the cushioning sheet and the wear-resistant and heat-resistant flexible sheet and between the cushioning sheet and the wear-resistant flexible sheet.

\* \* \* \* \*